United States Patent
Castagnoli

(10) Patent No.: US 8,599,822 B2
(45) Date of Patent: Dec. 3, 2013

(54) SLOT-BASED TRANSMISSION SYNCHRONIZATION MECHANISM IN WIRELESS MESH NETWORKS

(75) Inventor: Neal Dante Castagnoli, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 1578 days.

(21) Appl. No.: 11/213,292

(22) Filed: Aug. 26, 2005

(65) Prior Publication Data

US 2006/0215583 A1 Sep. 28, 2006

Related U.S. Application Data

(60) Provisional application No. 60/664,378, filed on Mar. 23, 2005.

(51) Int. Cl.
H04J 3/06 (2006.01)
(52) U.S. Cl.
USPC ........... 370/350; 370/238; 370/252; 370/351; 370/352; 370/355; 370/356; 455/450; 455/451; 455/452.1; 455/452.2; 709/238; 709/239; 709/240; 709/241; 709/242

(58) Field of Classification Search
USPC .............. 370/229, 230, 230.1, 231, 232, 233, 370/234, 235, 238, 238.1, 254, 329, 392, 370/395.31, 395.32, 395.4, 395.41, 395.42, 370/395.43, 406, 400, 442, 458, 459, 503, 370/508, 337, 351, 431, 252, 328, 330, 336, 370/338, 346, 347, 348, 443, 447, 448, 449, 370/350, 352, 355, 356; 455/450–452.2; 709/203, 230, 238–242
See application file for complete search history.

(56) References Cited

U.S. PATENT DOCUMENTS

| | | | | |
|---|---|---|---|---|
| 5,412,654 A | * | 5/1995 | Perkins | .......................... 370/312 |
| 6,292,508 B1 | | 9/2001 | Hong et al. | |
| 6,430,574 B1 | * | 8/2002 | Stead | ........................ 707/104.1 |
| 6,456,599 B1 | * | 9/2002 | Elliott | ........................... 370/254 |
| 6,751,248 B1 | * | 6/2004 | Tan | ................................ 375/132 |

(Continued)

OTHER PUBLICATIONS

Grace, K. *Mobile Mesh Link Discovery Protocol*, Internet Draft, IETF MANET Working Group, The MITRE Corporation, Sep. 22, 2000. http://www.mitre.org/work/tech_transfer/mobilemesh/draft-grace-manet-mmidp-00.txt.

(Continued)

*Primary Examiner* — Olumide T Ajibade Akonai
(74) *Attorney, Agent, or Firm* — Baker Botts L.L.P.

(57) ABSTRACT

Methods, apparatuses and systems directed to synchronizing transmissions among parent and child routing nodes in a hierarchical wireless mesh network. In one implementation, the present invention employs a time slot scheduling algorithm to coordinate communications between wireless nodes of a hierarchical tree. In one implementation, the present invention provides a wireless mesh network where slot scheduling information propagates throughout the mesh, while individual nodes in the mesh compute their respective time slot schedules based on this information and the current state of the network. In one such implementation, a parent routing node computes its slot schedule and transmits certain parameters to its child nodes (as opposed to the schedule itself). The child node(s) then iterates the same scheduling function based on the parameters passed to it to determine the slots with which it should communicate to its parent node and its child nodes.

23 Claims, 15 Drawing Sheets

(56) References Cited

U.S. PATENT DOCUMENTS

| | | | |
|---|---|---|---|
| 6,788,702 B1* | 9/2004 | Garcia-Luna-Aceves et al. | 370/458 |
| 6,791,997 B2* | 9/2004 | Beyer et al. | 370/447 |
| 6,816,510 B1 | 11/2004 | Banerjee | 370/503 |
| 6,963,747 B1* | 11/2005 | Elliott | 455/450 |
| 6,965,575 B2 | 11/2005 | Srikrishna et al. | |
| 7,027,409 B2* | 4/2006 | Cain | 370/252 |
| 7,072,904 B2* | 7/2006 | Najork et al. | 707/103 R |
| 7,142,527 B2* | 11/2006 | Garcia-Luna-Aceves | 370/336 |
| 7,174,170 B2 | 2/2007 | Steer et al. | |
| 7,280,489 B2* | 10/2007 | Hsu et al. | 370/256 |
| 2003/0058826 A1* | 3/2003 | Shearer, III | 370/338 |
| 2003/0179742 A1 | 9/2003 | Ogier et al. | |
| 2004/0252643 A1 | 12/2004 | Joshi | |
| 2005/0030968 A1* | 2/2005 | Rich et al. | 370/449 |
| 2005/0063319 A1* | 3/2005 | Kyperountas et al. | 370/254 |
| 2006/0109787 A1 | 5/2006 | Strutt et al. | |
| 2006/0114850 A1 | 6/2006 | Avinash | |
| 2006/0126536 A1 | 6/2006 | Patel et al. | |
| 2006/0209878 A1* | 9/2006 | Nelson | 370/458 |

OTHER PUBLICATIONS

Herman, Ted and Tixeuil, Sebastien, *A Distributed TDMA Slot Assignment Algorithm for Wireless Sensor Networks*. http://dcg.ethz.ch/lectures/ws0405/seminar/papers/distributedTDMA.pdf.

Perumal, Kannan, Patro, Ranjeet Kumar and Mohan, Balamurugan, *Neighbor Based TDMA slot Assignment algorithm for WSN*. http://dcg.ethz.ch/lectures/ws0405/serninar/papers/distributedTDMA.pdf.

PCT Notification of Transmittal of the International Search Report and the Written Opinion of the International Searching Authority, or the Declaration (PCT Rule 44.1) dated Feb. 21, 2007, International Application No. PCT/US06/10677.

Grace, K. *Mobile Mesh Link Discovery Protocol*, Internet Draft, IETF MANET Working Group, The MITRE Corporation, Sep. 22, 2000. http://www.mitre.org/work/tech_transfer/mobilemesh/draft-grace-manet-mmldp-00.txt.

Grace, K., *Mobile Mesh Routing Protocol*, Internet Draft, IETF MANET Working Group, The MITRE Corporation, Sep. 22, 2000. http://www.mitre.org/work/tech_transfer/mobilemesh/draft-grace-manet-mmrp-00.txt.

Arumugam, Mahesh and Kulkami, Sandeep S., *Self-Stabilizing Deterministic TDMA for Sensor Networks*, Michigan State University, Computer Science and Engineering. http://deneb.cs.kent.edu/~security/fall2004/pdf/Sensor.pdf.

* cited by examiner

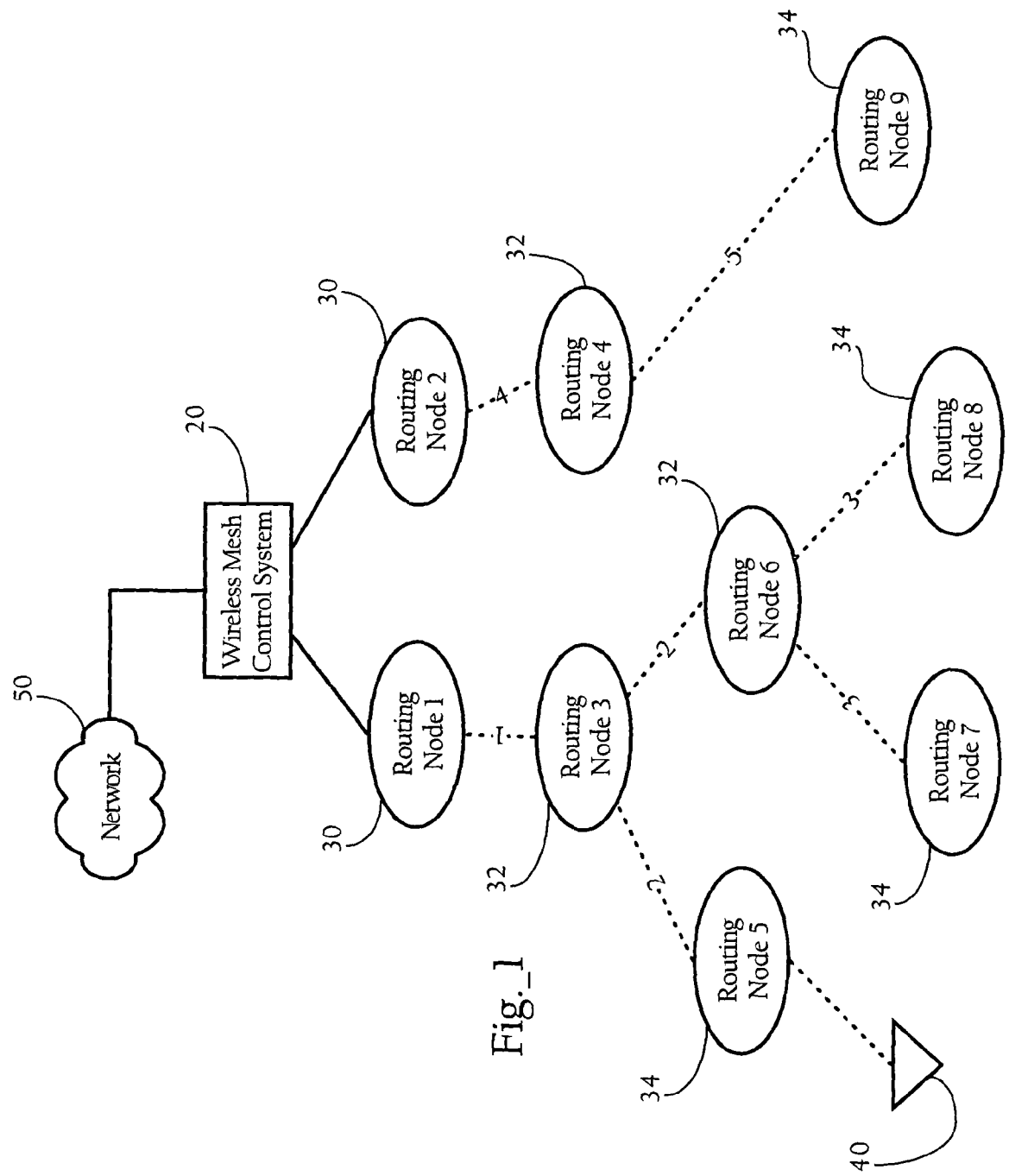
Fig_1

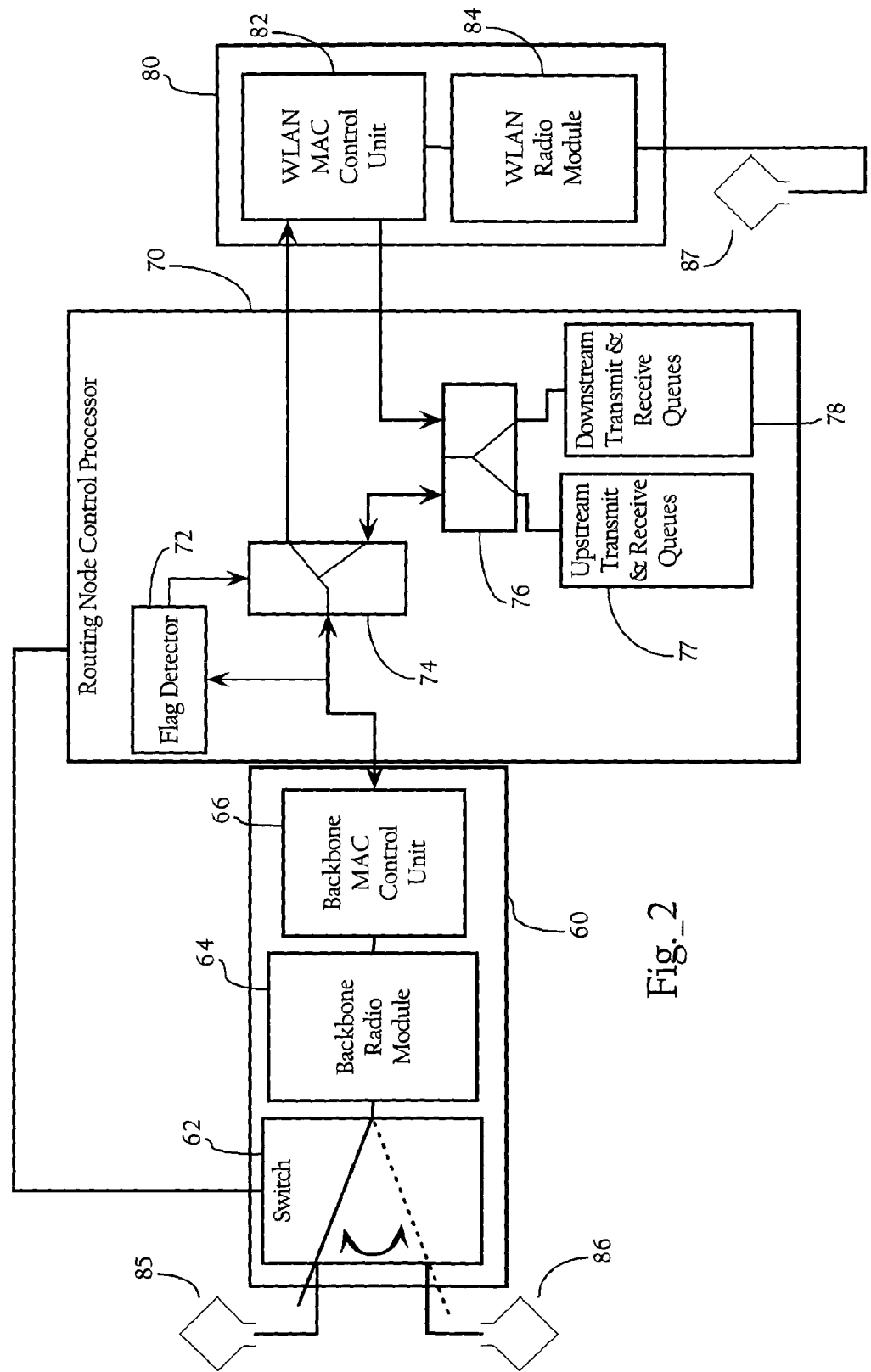
Fig._2

| Events/States | adjNull | adjTimerI1 | adjTimerI2 | adjRxNeigh | adjSyncFail | adjSyncSucc | adjAuthFail | adjAuthSucc | adjTimerMN | adjTimerMP |
|---|---|---|---|---|---|---|---|---|---|---|
| Start | RAP? Maint else SET1 SET2 Seek | ASRT | ASRT | ASRT | ASRT | ASRT | ASRT | ASRT | ASRT | ASRT |
| Seek | Seek | NEIGHE CI2 If TP Sync else Start | TXNEXT I1S Seek | NEIGHADD Seek | ASRT | ASRT | ASRT | ASRT | ASRT | ASRT |
| Sync | Sync | ASRT | ASRT | DSCRD Seek | BADD PDEL NEIGHE If TP Sync else Start | Auth | ASRT | ASRT | ASRT | ASRT |
| Auth | Auth | ASRT | ASRT | DSCRD Seek | Sync | ASRT | BADD NEIGHE If (TP1!={}) Sync else Start | PSET set state to Maint | ASRT | ASRT |
| Maint | If not RAP, Set MN, MP Maint | ASRT | ASRT | If (downlink) NEIGHADD Maint | set state to Sync | ASRT | ASRT | ASRT | NEIGHE No TP change Maint TP Synch No TP Start | TXNext Maint |

Fig._3A

| Events | |
|---|---|
| adjNull: Null Event | |
| adjTimerI1: Timer I1 expires. I1 is the seek period complete timer, at 8.8 seconds. | |
| adjTimerI2: Timer I2 expires. I2 is the next channel and transmit acquire packet, 50 m.s. | |
| adjRxNeigh: Receive a directed neighbor packet. | |
| adjSyncFail: LLC failed to synch to a node. | |
| adjSyncSucc: LLC synched to a node. | |
| adjAuthFail: Authorization procedure failed. | |
| adjAuthSucc: Authorization procedure succeeded. | |
| adjTimerMN: Neighbor maintenance timeout, 10s | |
| adjTimerMP: Neighbor poll timer, 1/3 s | |

| Procedures | |
|---|---|
| NEIGHADD: Add or update a neighbor to/in the PPL. | |
| NEIGHD: Remove a neighbor from the list of potential parents | |
| NEIGHE: Evaluate Neighbors, update Tentative Parent | |
| NEIGHU: Update time of last ACK and update routing information | |
| BADD: Add a node to the blacklist. | |
| PSET: Set the parent to the tentative parent. | |
| PDEL: Delete the parent. | |
| I1S, I1C, I2S, I2C, MNS,MNC,MPS,MPC: set and clear timers. | |
| ASRT: Invalid state/event combination | |
| DSCRD: Discard packet | |
| CNEXT: Advance channel list, xmit | |
| TXNEXT: If there is an unacked neighbor (priority to the parent), send a directed rx seek to it otherwise send a broadcast rx seek on the next channel | |

| Data Structures | |
|---|---|
| PPL: Potential Parent List, list of parents that have minimally acceptable RFS [sic]. | |
| P: The selected parent AP with least cost to the root AP | |
| Blacklist: List of nodes that APs should not use. | |
| TPS: Tentative Parent. | |

Fig._3B

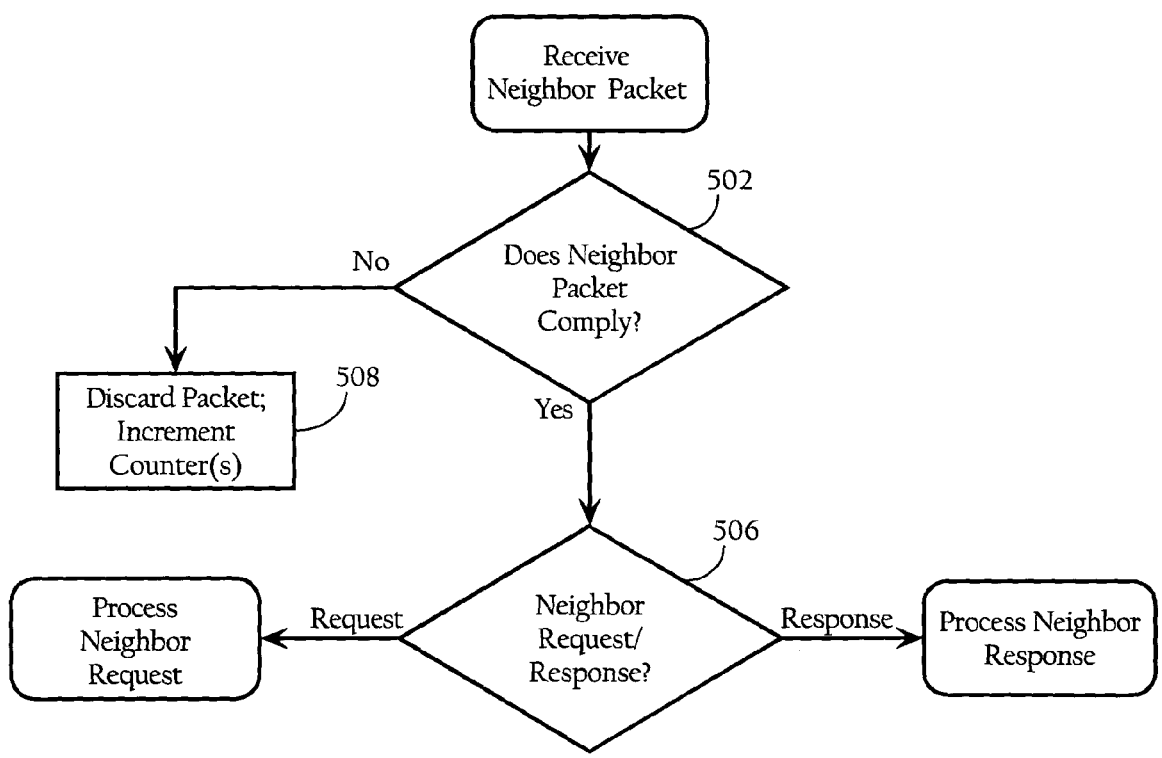
Fig._4

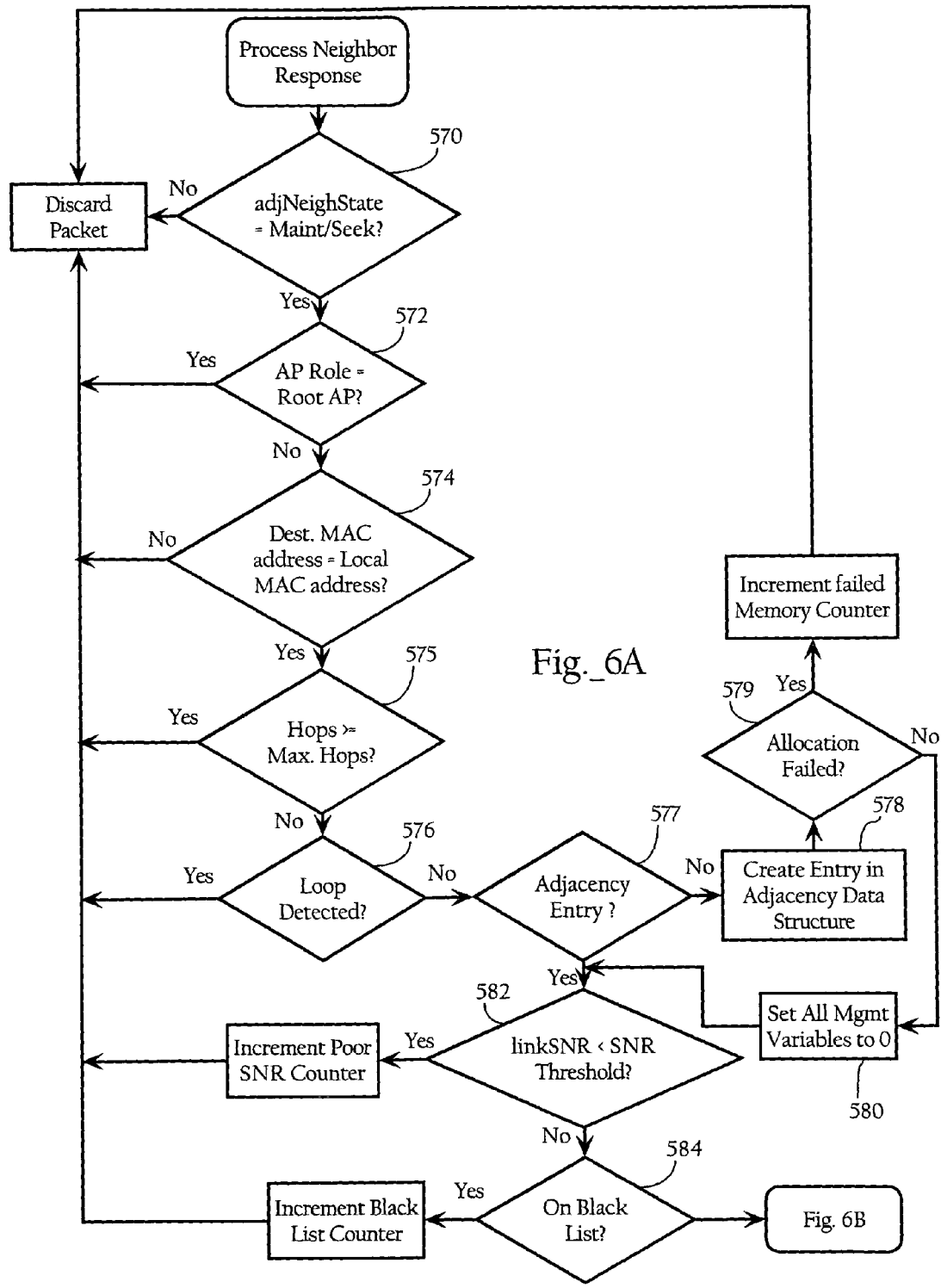
Fig._6A

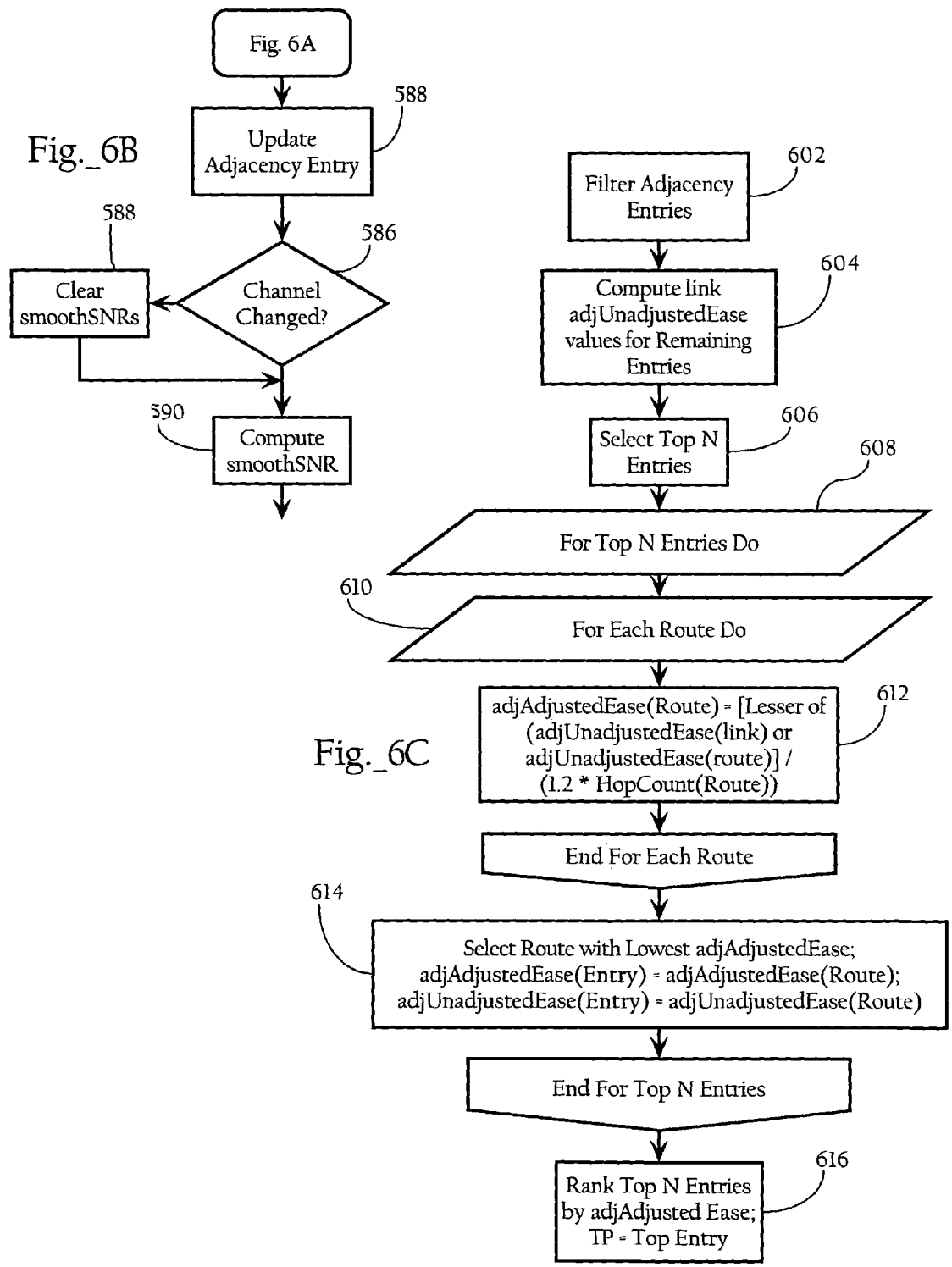

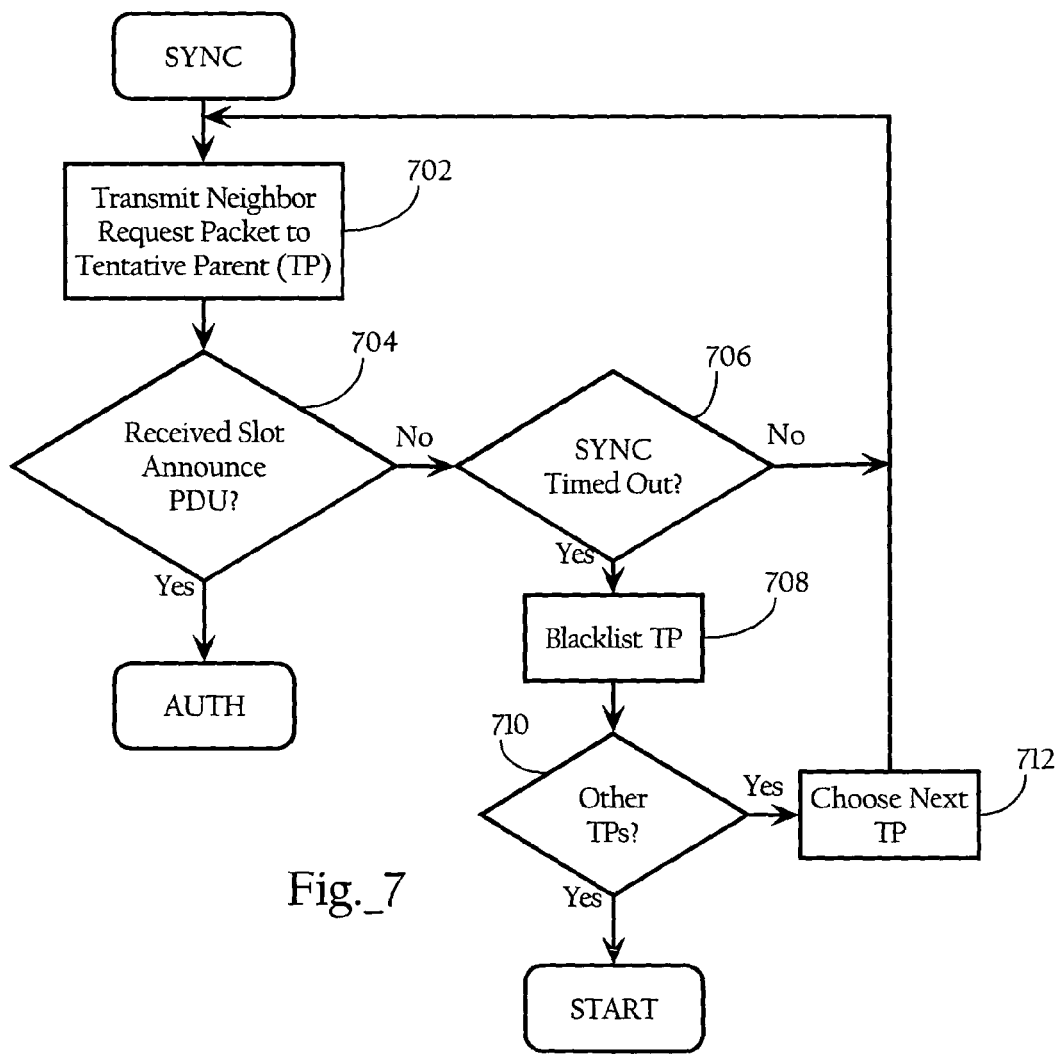
Fig._7

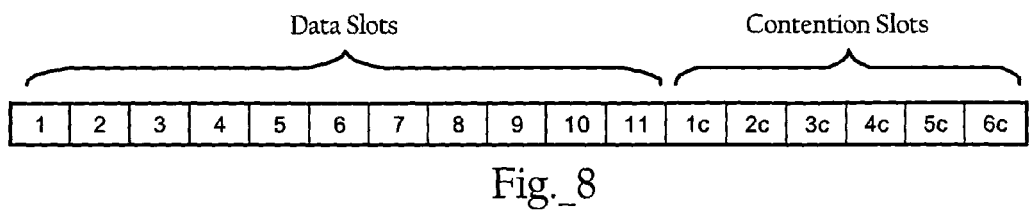
Fig._8
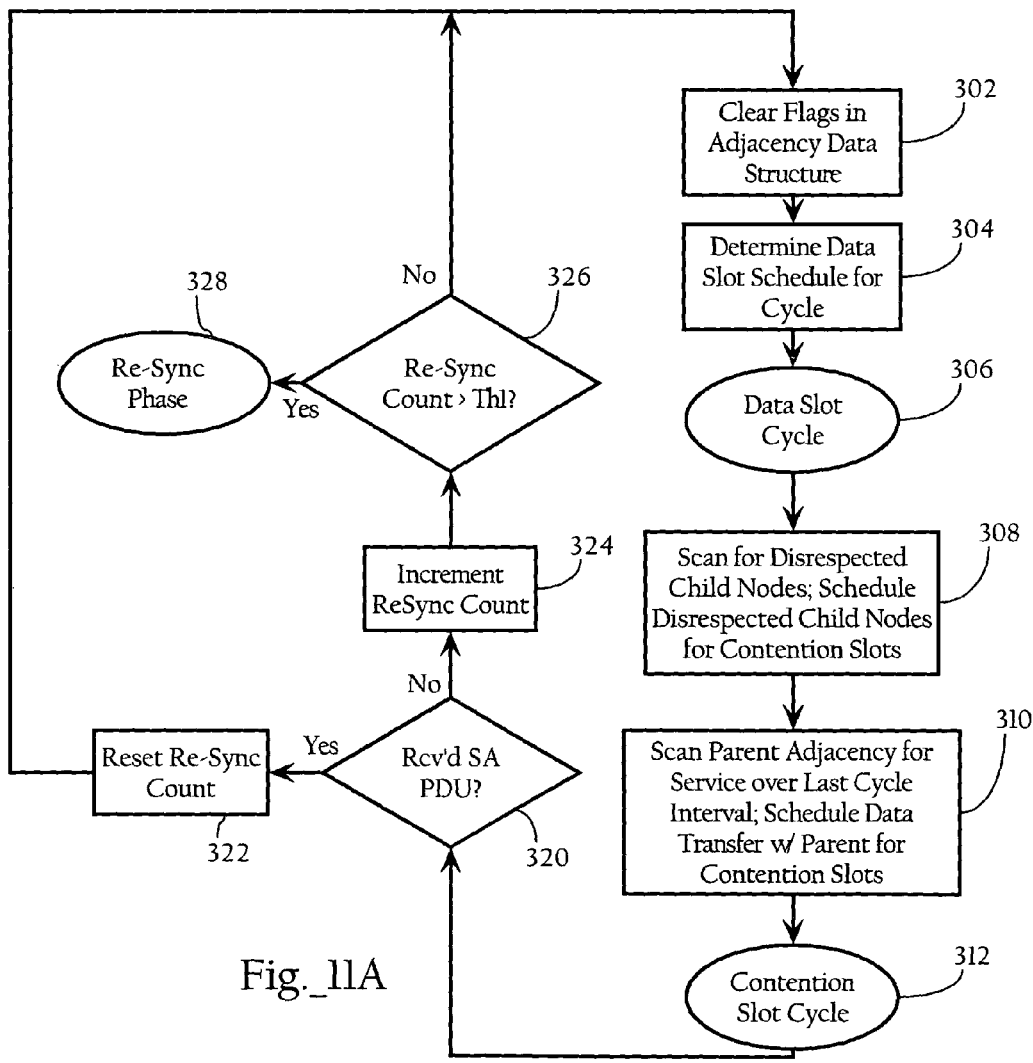
Fig._11A

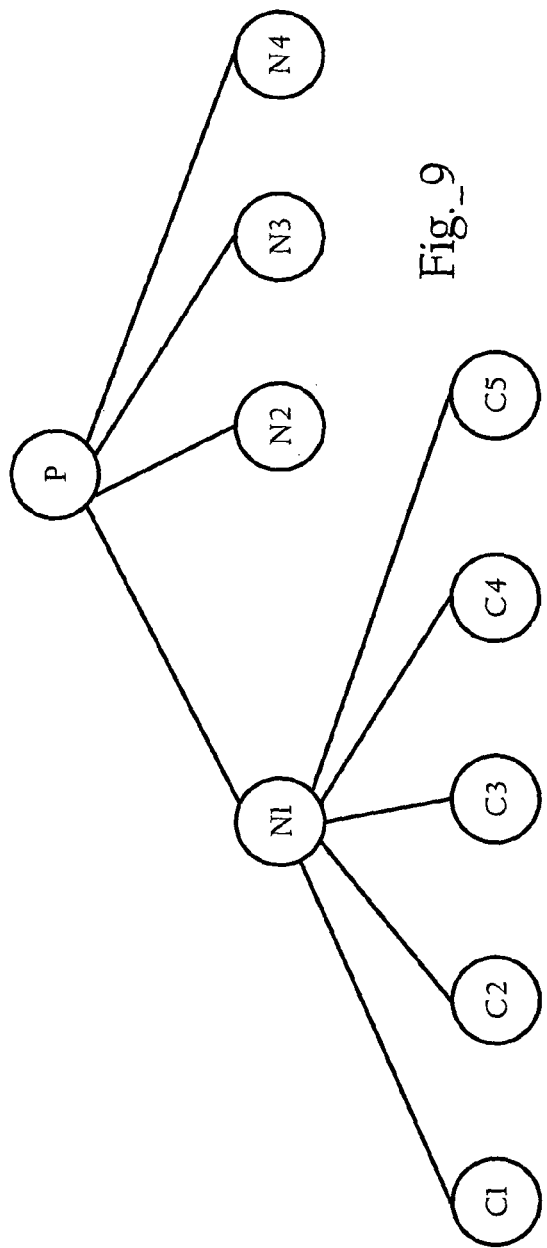
Fig._9
Fig._10A
Fig._10B

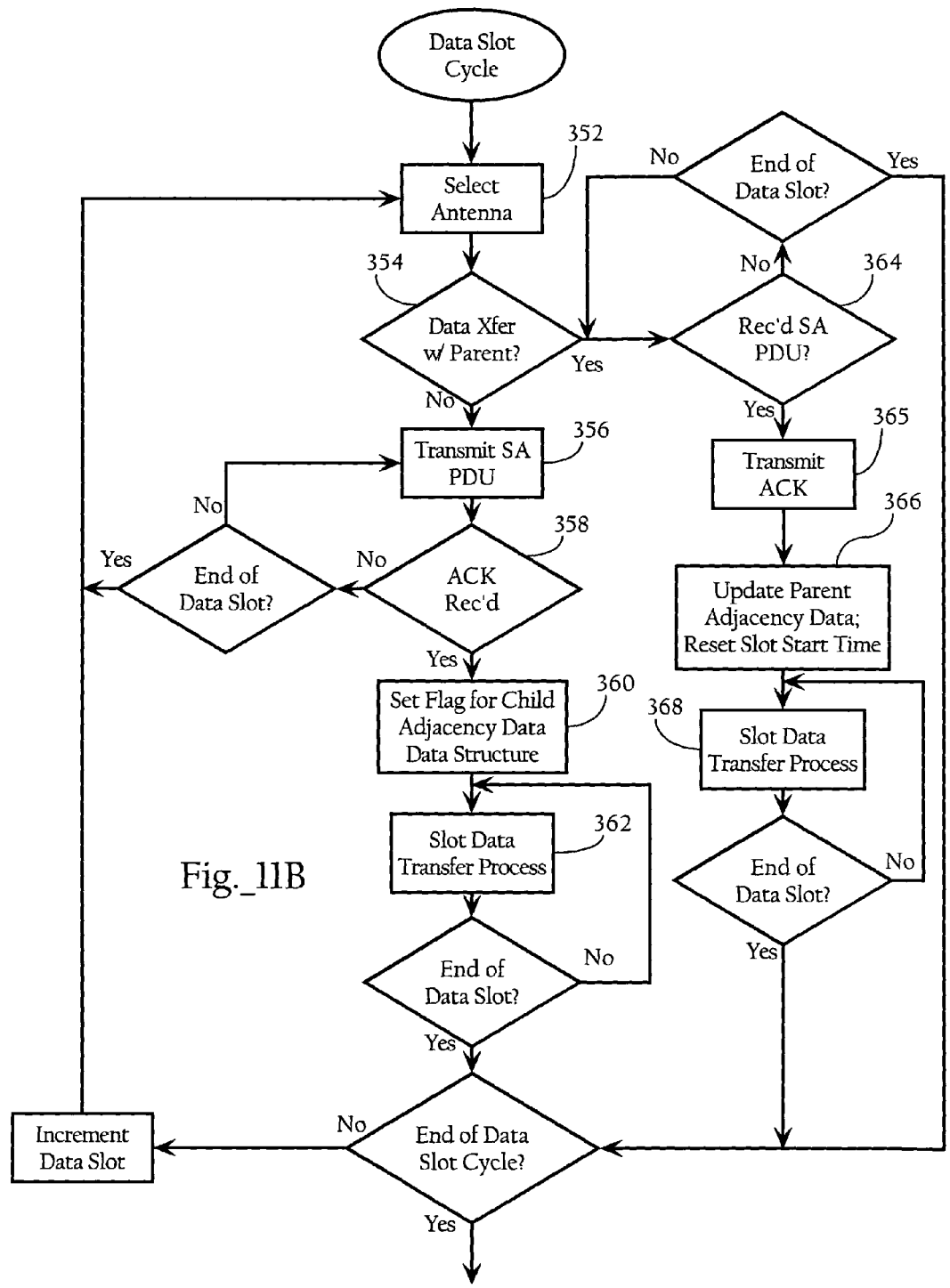
Fig._11B

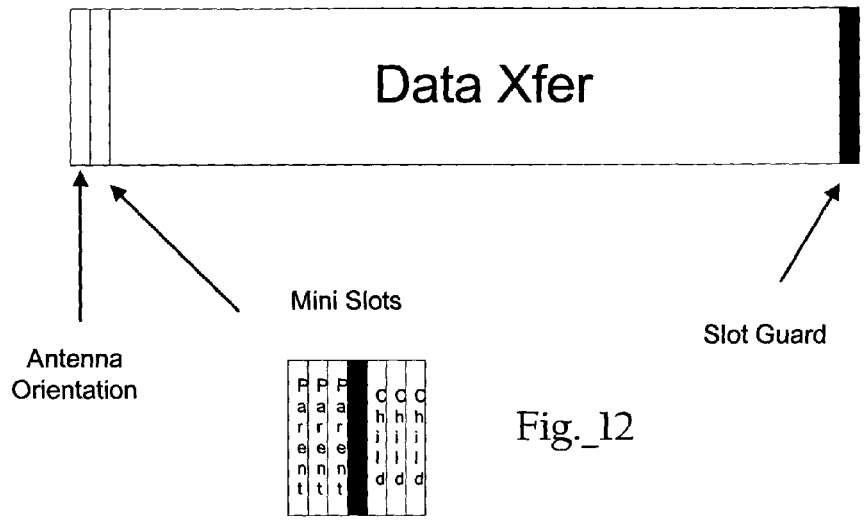
Fig._12
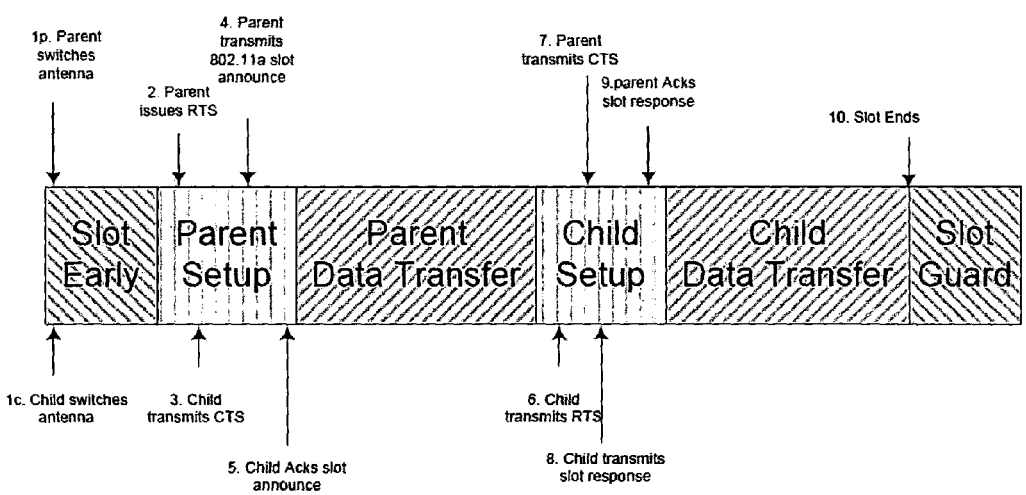
Fig._13

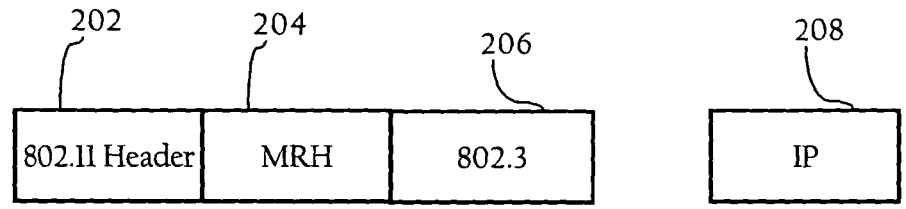
Mesh Network Frame
Fig._14
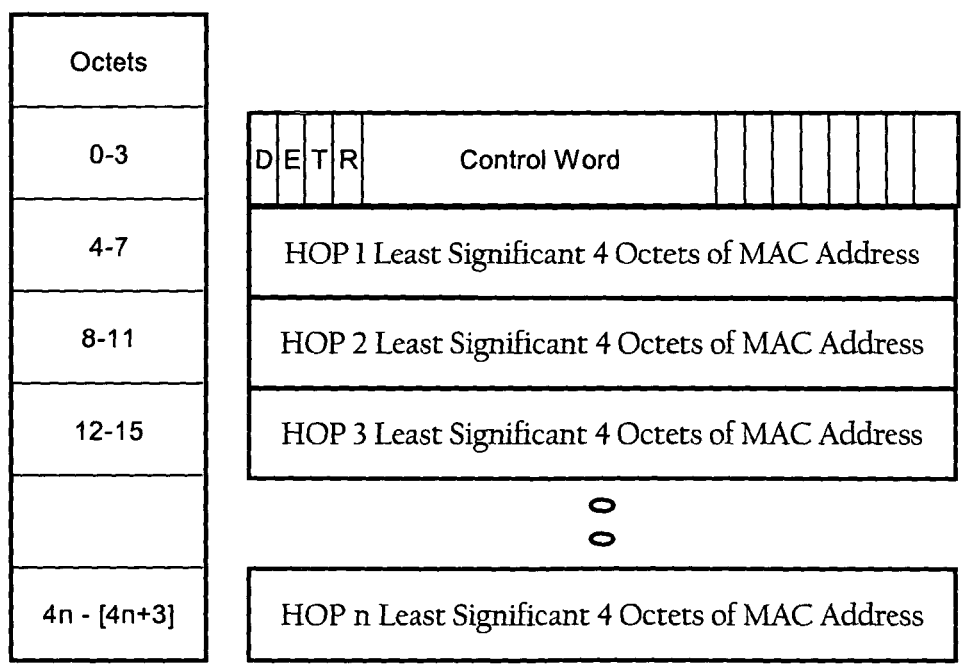
Fig._15

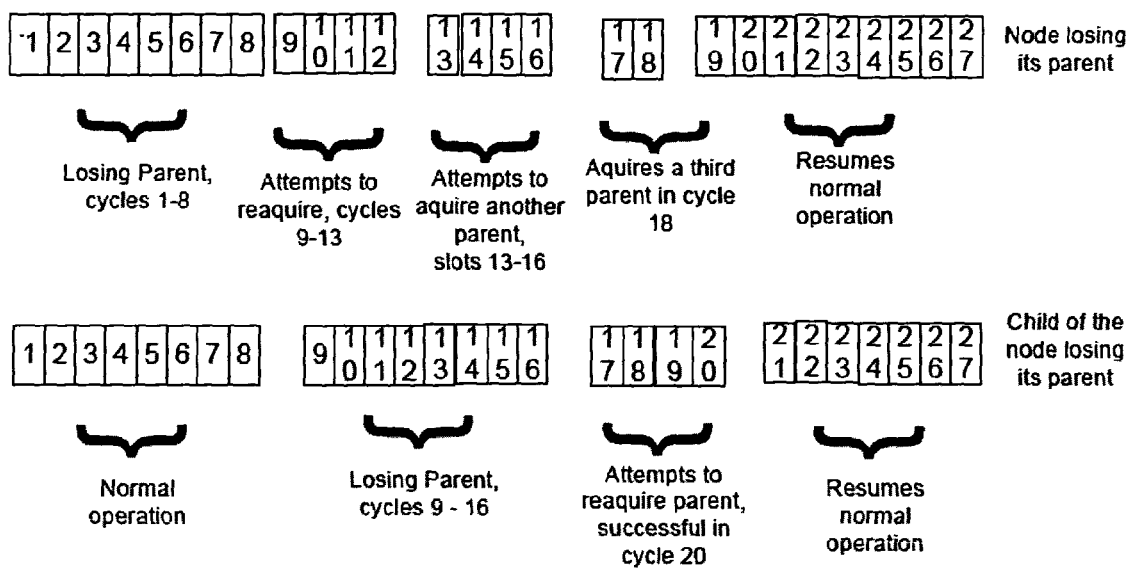
Fig._16

SLOT-BASED TRANSMISSION SYNCHRONIZATION MECHANISM IN WIRELESS MESH NETWORKS

CROSS-REFERENCE TO RELATED APPLICATIONS

The present application claims priority to U.S. Provisional Application Ser. No. 60/664,378 filed Mar. 23, 2005, entitled "Slot-Based Transmission Synchronization Mechanism in Wireless Mesh Networks," which is incorporated herein for all purposes. The present application is also related to the following U.S. patent applications filed concurrently herewith:

U.S. patent application Ser. No. 11/212,997 in the name of Neal Castagnoli, and entitled "Configuration of Failure and Acquire Timeouts to Facilitate Recovery from Failures in Hierarchical Mesh Networks;" and U.S. patent application Ser. No. 11/213,287 in the name of Neal Castagnoli and Robert Friday, and entitled "Automatic Route Configuration in Hierarchical Wireless Mesh Network."

This application also makes reference to the following commonly owned U.S. patent applications and/or patents, which are incorporated herein by reference in their entirety for all purposes:

U.S. patent application Ser. No. 10/831,908 in the name of Kenneth Leigh Peirce, Jr. and Paul F. Dietrich, and entitled "Synchronization of Upstream and Downstream Data Transfer In Wireless Mesh Topologies."

FIELD OF THE INVENTION

The present invention relates to wireless mesh communication networks and, more particularly, to a slot-based synchronization mechanism that facilitates data transfer between routing nodes in a wireless mesh network.

BACKGROUND OF THE INVENTION

Wireless mesh communication networks typically consist of a plurality of wireless routing nodes that operate in a peer-to-peer fashion to establish communication paths to one another for the purposes of providing network access to wireless clients or mobile stations. Some wireless mesh networks are hierarchical in nature with the routing nodes that bridge wireless traffic onto a wired network at the top of the hierarchy. The wireless mesh routing nodes can be one-, two-, or multiple radio systems including omni-directional and/or directional antennas, and systems that provide backhaul traffic over the same mesh hierarchy but over multiple channels. In one-radio systems, the radio unit is used for purposes of acting as an access point to its clients, as well as acting as a backhaul to a parent routing node. In two-radio systems, one radio unit typically provides access point service to wireless clients as well as child routing nodes, while the other radio unit is used as a backhaul to a parent routing node. Multiple radio designs typically dedicate one radio for access, one or more to service the backhaul, and may also dedicate a radio for the purposes of monitoring the RF environment and other conditions on multiple radio frequencies. In certain wireless mesh networks, the backhaul radio operates in ad-hoc station mode, appearing as a peer node to the parent routing node. Those radios in the network providing access to clients operate in access point mode, providing wireless connections to mobile stations.

As the number of routing nodes in a wireless mesh network increases, certain problems are created due to the fact that the routing nodes essentially share, and therefore compete for access to, the transmission medium. To avoid radio interference among the routing nodes, each routing node in a wireless mesh network may generally employ a packet collision avoidance mechanism as part of the wireless communications protocol, such as the 802.11 protocol. Accordingly, a typical way of initiating communication between routing nodes begins with the transmission of a "Request-to-send" (RTS) packet by an initiating routing node. This packet is typically received by all routing nodes within the transmission range of, and operating on the same channel, as the initiating routing node. The RTS packet notifies these routing nodes that the initiating routing node intends to transmit a flow of packets to a specified target routing node. After receiving an RTS packet, the target routing node responds by transmitting a "Clear-to-send" (CTS) packet that notifies the initiating routing node that the target routing node is ready to receive the data stream. The CTS packet also serves to notify other routing nodes within range that the transmission medium has been reserved such that they refrain from transmissions that might interfere with the transmission between the initiating and target routing nodes. Accordingly, since other routing nodes within range of the initiating and target routing nodes are forced to remain idle during transmission of the data stream, system throughput can be drastically impaired as the number of routing nodes and clients increase. Further, IEEE 802.11 or other collision avoidance mechanisms may not ensure that each routing node receives a fair share of access to the transmission medium.

To address these problems, mesh network routing nodes can employ channel assignment schemes and mechanisms to reduce or eliminate interference between adjacent routing nodes. The limited number of non-overlapping operating channels in a given band, however, does present certain limitations for channel re-use when the number and/or density of routing nodes increases. Directional antennas have also been deployed to reduce or control interference across routing nodes. Without some coordination mechanism, however, interference between routing nodes, as well as fair access to the transmission medium, remains a significant factor. In light of the foregoing, a need in the art exists for coordinating wireless transmissions across routing nodes in a wireless mesh network. Embodiments of the present invention substantially fulfill this need.

DESCRIPTION OF THE DRAWINGS

FIG. 1 is a functional block diagram that illustrates a hierarchical wireless mesh network according to an implementation of the present invention.

FIG. 2 is a schematic diagram illustrating the logical configuration, according to one implementation of the present invention, of a wireless routing node.

FIG. 3A is a state diagram illustrating the states and events implemented by a routing node, according to one implementation of a wireless mesh network.

FIG. 3B is a chart showing events, procedure descriptions and data structures associated with the state diagram of FIG. 3A.

FIG. 4 is a flow chart diagram illustrating operation of a neighbor state machine according to one implementation of the present invention.

FIGS. 6A and 6B, together, provide a flow chart diagram illustrating processing of a neighbor response packet according to one implementation of the present invention.

FIG. 6C illustrates a process flow, according to one implementation of the invention, directed to evaluating adjacency entries FIG. 7 is a flow chart illustrating operation of a routing node during the SYNC state.

FIG. 8 is a diagram illustrating the data slots and contention slots in a cycle interval according to one implementation of a wireless mesh network.

FIG. 9 is a block diagram illustrating a hierarchical wireless mesh network according to another implementation of the present invention.

FIG. 10A illustrates the data and contention slot schedule of a parent routing node in the wireless mesh network illustrated in FIG. 9.

FIG. 10B sets forth the data and contention slot schedule of a child node in the wireless mesh network illustrated in FIG. 9.

FIG. 11A is a flow chart diagram setting for a method, according to one implementation of the present invention, directed to synchronizing transmissions across routing nodes in a wireless mesh network.

FIG. 11B is a flow chart diagram setting for a method, according to one implementation of the present invention, directed to synchronizing transmissions during a data slot phase between parent and child nodes in a wireless mesh network.

FIG. 12 is a diagram illustrating elements of a data slot according to one implementation of the invention.

FIG. 13 is a diagram setting forth the coordination of data transmissions between two routing, nodes within a data slot.

FIG. 14 sets forth the frame layout, according to one implementation of the invention, of a wireless frame transmitted across the backhaul of a wireless mesh network.

FIG. 15 provides the layout of a message routing header according to one implementation of the present invention.

FIG. 16 is a diagram illustrating the operation of the node failure and acquisition mechanisms, according to one implementation of the present invention.

DESCRIPTION OF PREFERRED EMBODIMENT(S)

Figure 5A:
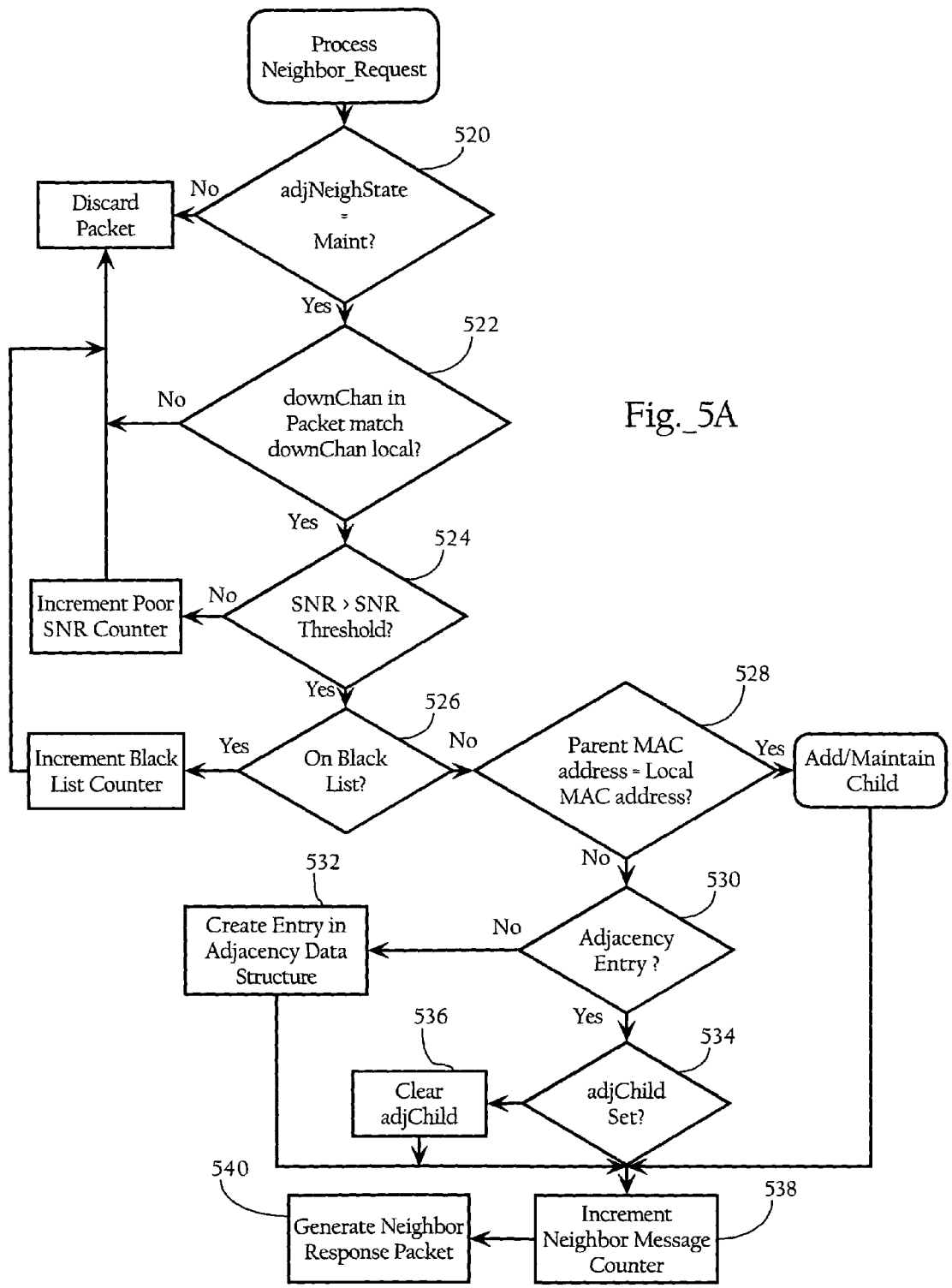
FIG. 5A is a flow chart diagram that shows processing of a neighbor request packet according to one implementation of the present invention.

As will become apparent from the following description, implementations of the present invention are directed to synchronizing transmissions among parent and child routing nodes in a hierarchical wireless mesh network. In one implementation, the present invention employs a time slot scheduling algorithm to coordinate communications between wireless nodes of a hierarchical tree. In one implementation, the present invention provides a wireless mesh network where slot scheduling information propagates throughout the mesh, while individual nodes in the mesh compute their respective time slot schedules based on this information and the current state of the network. In one such implementation, a parent routing node computes its slot schedule and transmits certain parameters to its child nodes (as opposed to the schedule itself). The child node(s) then iterates the same scheduling function based on the parameters passed to it to determine the slots with which it should communicate to its parent node and its child nodes. In some implementations, additional algorithms are layered on the time slotting algorithm to provide additional random access to facilitate transfer of control or management data. The present invention, in one implementation, assures scheduling fairness among routing nodes in a wireless mesh network. In one implementation, the present invention, also allows for the use of a single radio dedicated to wireless backbone transmissions thereby reducing the cost of routing nodes. In one implementation, at least some of the routing nodes in the wireless mesh network include a second radio and associated wireless communication functionality to provide wireless access to mobile stations. The present invention can be deployed in a variety of hierarchical network topologies.

For didactic purposes, an embodiment of the present invention is described as operating in a hierarchical wireless mesh network illustrated in FIG. 1. The present invention, however, can operate in a wide variety of hierarchical mesh network configurations. FIG. 1 illustrates a wireless mesh network according to an implementation of the present invention. In one implementation, the wireless mesh network includes a wireless mesh control system 20, and a plurality of routing nodes. In one implementation, a hierarchical architectural overlay is imposed on the mesh network of routing nodes to create a downstream direction towards leaf routing nodes 34, and an upstream direction toward the root routing nodes 30. For example, in the hierarchical mesh network illustrated in FIG. 1, first hop routing node 1 30 is the parent of intermediary routing node 3 32. In addition, intermediate routing node 3 32 is the parent to leaf routing node 5 34, and intermediate routing node 6 32. In one implementation, this hierarchical relationship is used in routing packets between wireless clients 40, or between wireless clients 40 and network 50. As discussed in more detail below, this hierarchical architecture is also used in synchronizing transmissions between parent and child routing nodes. In the wireless mesh network illustrated in FIG. 1, the routing nodes are arranged in two hierarchical tree structures—one root node is routing node 1, while the other root node is routing node 2. Of course, a variety of hierarchical configurations are possible including fewer or greater number of hierarchical tree structures. Still further, the hierarchical configuration may be dynamic in that the parent and child relationships between routing nodes may change depending on factors, such as congestion, node failures and the like. As discussed in more detail below, implementations of the present invention allow for automatic configuration of the hierarchical routing overlay. In addition, some implementations of the present invention adapt to changing conditions of the hierarchical mesh network, such as RF interference, node failures, and the like.

The routing nodes in the mesh network, in one implementation, generally include one radio, operating in a first frequency band, and associated wireless communication functionality to communicate with other routing nodes to thereby implement the wireless backbone, as discussed more fully below. All or a subset of the routing nodes, in one implementation, also include an additional radio, operating in a second, non-interfering frequency band, and other wireless communication functionality to establish and maintain wireless connections with mobile stations, such as wireless client 40. For example, in 802.11 wireless networks, the backbone radios on the wireless routing nodes may transmit wireless packets between each other using the 802.11a protocol on the 5 GHz band, while the second radio on each wireless node may interact with wireless clients on the 2.4 GHz band (802.11b/g). Of course, this relation can also be reversed with backhaul traffic using the 802.11b/g frequency band, and client traffic using the 802.11a band.

FIG. 1 also illustrates a channel assignment within a given frequency band between routing nodes according to one possible implementation of the present invention. In one implementation, the routing nodes for a given tree and a given hop are set to the same channel. Additionally, for a given routing node, the operating channel for upstream data transfer, in one implementation, is different than the operating channel used for downstream data transfer. For example, wireless transmissions between routing node 1 and routing node 3 occur on channel 1, while routing node 3 communicates with routing node 5 and routing node 6 on channel 2. In one implementation, the upstream and downstream channels assigned to a given routing node are non-overlapping channels, while in other implementations they are overlapping channels. In one implementation, the channel assignments between routing nodes is statically configured. In other implementations, operating channels can be dynamically assigned. However, this channel assignment scheme is not required by the present invention. In other implementations, all routing nodes in the mesh network operate on the same channel within the backhaul frequency band.

As discussed more fully below, each routing node in the mesh network, in one implementation, is operative to transmit and receive packets from other routing nodes according to a mesh routing hierarchy. Each mesh routing node, in one implementation, is further operative to establish and maintain wireless connections to one or more wireless client devices 40. Mesh network control system 20, in one implementation, is operative monitor to which routing node each wireless client is associated and route packets destined for the wireless clients to the wireless routing node to which the client is associated.

A. Mesh Routing Node Configuration

The following describes, for didactic purposes, the configuration of a mesh routing node according to one implementation of the present invention. Other routing node configurations are possible. FIG. 2 is a schematic diagram illustrating the logical and/or operating components according to one implementation of the present invention. The routing node illustrated in FIG. 2 includes a wireless backbone interface unit 60 operating in a first frequency band, and a WLAN interface unit 80 operating in a second frequency band. Specifically, as FIG. 2 illustrates, a mesh routing node generally comprises routing node control processor 70, wireless backbone interface unit 60, and WLAN interface unit 80. In one implementation, the routing node control processor 70, wireless backbone interface unit 60, and WLAN interface unit 80 are operably connected to each other via a system bus. Wireless back bone interface unit 60 is operative to transfer wireless frames to upstream (parent) and downstream (child) routing nodes under the control of routing node control processor 70, as discussed more fully below. WLAN interface unit 80, in one implementation, is operative to transfer wireless frames to and from wireless clients 40 under control of routing node control processor 70.

Wireless backbone interface unit 60, in one implementation, comprises first and second antennas 85 and 86, switch 62, backbone radio module 64, and backbone MAC control unit 66. In other implementations using a single omni-directional antenna, switch 62 is not required. Backbone radio module 64 includes frequency-based modulation/demodulation functionality for, in the receive direction, demodulating radio frequency signals and providing digital data streams to backbone MAC control unit 66, and in the transmit direction, receiving digital data streams and providing frequency modulated signals corresponding to the digital data stream. In one embodiment, radio module 64 is an Orthogonal Frequency Division Multiplexed (OFDM) modulation/demodulation unit. Of course, other modulation and multiplexing technologies can be employed, such as Frequency Hopping Spread Spectrum (FHSS) or Direct Sequence Spread Spectrum (DSSS). Backbone MAC control unit 66 implements data link layer functionality, such as detecting individual frames in the digital data streams, error checking the frames, and the like. In one embodiment, backbone MAC control unit 66 implements the 802.11 wireless network protocol (where 802.11, as used herein, generically refers to the IEEE 802.11 standard for wireless LANs and all its amendments). In one embodiment, the functionality described herein can be implemented in a wireless network interface chip set, such as an 802.11 network interface chip set. Of course, the present invention can be used in connection with any suitable radio-frequency-based wireless network protocol. Switch 62 switches between first antenna 85 and second antenna 86 under the control of routing node control processor 70.

WLAN interface unit 80 comprises WLAN MAC control unit 82, WLAN radio module 84, and at least one antenna 87. Similar to backbone interface unit 60, WLAN radio module 84 includes frequency-based modulation/demodulation functionality for, in the receive direction, demodulating radio frequency signals and providing digital data streams to WLAN MAC control unit 82, and in the transmit direction, receiving digital data streams and providing frequency modulated signals corresponding to the digital data stream. In one embodiment, WLAN radio module 84 is an Orthogonal Frequency Division Multiplexed modulation-demodulation unit. In one embodiment, radio module 84 implements the OFDM functionality in a manner compliant with the IEEE 802.11a or the 802.11g protocol, and operates in either the 5 GHz or 2.4 GHz band, respectively. WLAN radio module 84 may also operate in a manner consistent with the 802.11b protocol employing DSSS data transmission schemes. However, as discussed above, the frequency band in which the radio module 84 operates is configured, in one implementation, to be non-interfering relative to the backbone radio module 64. WLAN MAC control unit 82 implements data link layer functionality, such as detecting individual frames in the digital data streams, error checking the frames, and the like. In one embodiment, WLAN MAC control unit 82 implements the 802.11 wireless network protocol. Other suitable wireless protocols can be used in the present invention. In one embodiment, the functionality described herein can be implemented in a wireless network interface chip set, such as an 802.11 network interface chip set. Still further, WLAN interface unit 80, in one implementation, includes fast path and slow path transmit queues to allow high priority traffic (e.g., management frames) to have better or prioritized access to the communications medium over regular network traffic. Wireless backbone interface unit 60 may have similar priority functionality as well.

As discussed above, wireless backbone interface unit 60 and WLAN interface unit 80, in one implementation, operate in different frequency bands. For example, in one embodiment, backbone radio module 64 implements the OFDM encoding scheme in a manner compliant with the IEEE 802.11a protocol and, thus, operates in the 5 GHz band. WLAN radio module 84 operates in the 2.4 GHz band in a manner consistent with either the 802.11b and/or 802.11g protocol. The use of different frequency bands for wireless backbone traffic and client traffic ensures that wireless client traffic does not substantially affect or disrupt operation of the wireless backbone implemented by the routing nodes. In addition, the use of different frequency bands for wireless backbone and wireless client traffic facilitates the use of channel selection algorithms to address in-band RF interference, as more channels are available for each traffic type. Of course, other schemes are possible, as the selection of frequency band for wireless backbone traffic and wireless traffic between clients and routing nodes is a matter of engineering choice. In other implementations, different non-overlapping channels within the same band can be used for wireless backbone traffic and client traffic.

FIG. 2 also illustrates the logical configuration of routing node control processor 70. Routing node control processor 70, in one implementation, generally refers to the hardware modules (e.g., processor, memory), software modules (e.g., drivers, etc.) and data structures (e.g., frame buffers, queues, etc.) that control operation of the routing node. In one implementation, routing node control processor 70 generally comprises a processor (e.g., a Central Processing Unit (CPU), etc.), a memory (e.g., RAM, EPROMS, etc.), and a system bus interconnecting the memory, the processor and the network interfaces. Routing node control processor 70 may further comprise an operating system and one or more software modules and/or drivers for implementing the functions described herein. Routing node control processor 70, as discussed above, controls the operation of wireless backbone interface unit 60 and WLAN interface unit 80, both of which may reside on network cards operably connected to the system bus. In one implementation, routing node control processor 70 is operative to control the operation of wireless backbone interface unit 60 to synchronize uplink and downlink transmission with other routing nodes in the mesh network (see Section B, below). As discussed above, wireless backbone interface unit 60, in the receive direction, provides wireless frames received at first antenna 85 or second antenna 86 to routing node control processor 70. Flag detector 72, in one implementation, is operative to inspect wireless frames received from other routing nodes, and to determine whether the wireless frames should be forwarded along the wireless backbone or to a wireless client associated with the instant routing node via WLAN interface unit 80. In response to control signals transmitted by flag detector 72, logical switch 74 transmits the wireless packets along a WLAN path to WLAN interface unit 80, or a wireless backbone path to the upstream or downstream queues 77, 78. As FIG. 2 illustrates, routing node control processor 70 also includes logical switch 76 that switches between upstream transmit and receive queues 77 and downstream transmit and receive queues 78 depending on the current operational phase or mode. For example, wireless frames received from a parent routing node during the parent slot are buffered in the downstream transmit/receive queues 78 for transmission to a child routing node for transmission in the appropriate child slot. Oppositely, wireless frames received from a child routing node during the downstream phase are buffered in the parent slot queue 77 for transmission to the parent routing node during the upstream phase. In one implementation, routing node control processor 70 maintains separate transmit and receive queues for each of the parent and child routing nodes to which the current node is associated. In the transmit direction, logical switch 76 switches between the downstream and upstream queues depending on the transmission phase and the slot schedule. For example, during an upstream transmission data slot with a parent routing node, logical switch 76 allows wireless frames stored on upstream transmit/receive queue 77 to be transmitted to the parent routing node via antenna 85 or 86. During a child data slot, logical switch 76 allows wireless frames stored in one of the downstream transmit/receive queues 78 to be transmitted to a corresponding child routing node via antenna 85 or 86. In one implementation, both the upstream and downstream queues 77, 78 may include separate queuing structures to achieve a variety of purposes. For example, routing node control processor 70 may be configured to include fast path and slow path queues for each of the upstream and downstream queues 77, 78.

As discussed above, routing node control processor 70 is operative to switch between first and second antennas 85, 86 based on the current transmission phase (i.e., a parent or child data slot). First antenna 85, in one implementation, can be used for data transfer with a parent routing node, while second antenna 86 can be used for transfer with one or more child routing nodes. In one embodiment, first and second antennas 85, 86 are directional antennas whose peak gains are oriented depending on the location of the parent and child routing nodes. For example, in one implementation, first antenna 85 is generally oriented in the direction of the parent routing node. Second antenna 86 is oriented in the general direction of one or more child routing nodes. In one implementation, the peak gain and beamwidth of the downstream directional antennas place an effective limit on the separation between the child routing nodes. However, in other implementations, the child and parent routing nodes are not associated with a particular antenna. As discussed more fully below, the antenna used to communicate with a given routing node can be determined during a neighbor discovery and maintenance process. Antennas 85, 85 can be any suitable directional antennas, such as patch antennas, yagi antennas, parabolic and dish antennas. In one embodiment, the peak gains of the antennas are offset from one another in a manner that maximizes coverage in all directions.

In another implementation, an omni-directional antenna can be used in place of first and second antennas 85, 86. In one such implementation, one operating channel can be selected for downstream data transfer, while another non-overlapping channel can be selected for upstream data transfer. Routing node control processor 70 switches between the upstream and downstream data slot phases by controlling backbone radio module 64 to switch between the downstream and upstream channels according to the synchronization mechanism discussed herein. Of course, a plurality of omni-directional antennas can also be used in connection with spatial antenna pattern diversity schemes to ameliorate multipath effects in indoor and outdoor systems.

In one embodiment, the routing nodes include functionality allowing for detection of the signal strength, and other attributes, of the signal received from neighboring routing nodes. For example, the IEEE 802.11 standard defines a mechanism by which RF energy is measured by the circuitry (e.g., chip set) on a wireless network adapter or interface card. The 802.11 protocol specifies an optional parameter, the receive signal strength indicator (RSSI). This parameter is a measure by the PHY layer of the energy observed at the antenna used to receive the current packet or frame. RSSI is measured between the beginning of the start frame delimiter (SFD) and the end of the PLCP header error check (HEC). This numeric value is typically an integer with an allowable range of 0-255 (a 1-byte value). Typically, 802.11 chip set vendors have chosen not to actually measure 256 different signal levels. Accordingly, each vendor's 802.11-compliant adapter has a specific maximum RSSI value ("RSSI_Max"). Therefore, the RF energy level reported by a particular vendor's wireless network adapter will range between 0 and RSSI_Max. Resolving a given RSSI value reported by a given vendor's chip set to an actual power value (dBm) can be accomplished by reference to a conversion table. In addition, some wireless networking chip sets also report received signal strength in SNR which is the ratio of Signal to Noise, rather than or in addition to RSSI which is an absolute estimate of signal power. Many chip sets include functionality and corresponding APIs to allow for a determination of signal-to-noise ratios (SNRs) associated with packets received on the wireless network interfaces. As discussed more fully below, detected signal attribute information can be used in automatically configuring the mesh network.

Root routing nodes 30 and leaf routing nodes 34 can include a subset of the functionality discussed above, since these routing nodes do not have either a parent or child routing node. For example, both root and leaf routing nodes 30, 34 can each be configured to include a single directional, or omni-directional, antenna. Other functionality can also be omitted such as switch 62. In one implementation, however, each root or leaf routing node can include all the essential physical functionality discussed above, and be configured to operate in a root or leaf routing mode (as appropriate), where the downstream/upstream synchronization functionality is disabled. In that case, the leaf routing nodes 34, for example, operate in upstream mode waiting for their respective data slots; A configuration mechanism facilitates reconfiguration and extensions to the mesh network. For example, the wireless mesh network may be extended by simply adding additional routing nodes in the downstream direction of a leaf routing node and re-configuring the leaf routing node.

Other configurations are also possible. For example, the wireless routing node can include more than two directional antennas. For example, each backbone radio interface may be operably connected to four directional antennas, whose peak gains are each oriented at 90 degrees to each other. Still further, as discussed in more detail below, each routing node further comprises a neighbor state machine operative to discover and maintain data relating to neighboring routing nodes.

B. Neighbor Message Processing and Routing Configuration

The following sets forth a routing configuration mechanism, according to one embodiment of the invention, implemented by the nodes in the wireless mesh. In one implementation, each node in the wireless mesh network implements a neighbor state machine that is directed to transmitting and receiving neighbor messages from other routing nodes in the wireless mesh. The neighbor messages are used by each routing node, in one implementation, to automatically configure and maintain the hierarchical routing configuration across the mesh network. The processing of neighbor messages allows for dynamic discovery of routing nodes in the mesh network, facilitates determination of preferred antennas for communicating with neighboring routing nodes, and allows for failure detection and other wireless network conditions and events. In one implementation, the neighbor and route management functionality implemented on each node is responsible for one or more of the following tasks: 1) discovering neighboring routing nodes; 2) maintaining a list of attractive neighbor routing nodes as tentative parent routing nodes; 3) selecting a neighbor routing node to act as a parent routing node in the routing system hierarchy; 4) advertising route metrics to neighboring routing nodes; 5) maintaining a list of undesirable neighbor routing nodes.

The neighbor messages, in one implementation, contain logical path information (e.g., number of hops to the root, distance vectors, etc.) and physical path information (e.g., Signal-to-Noise Ratios of received packets between routing nodes) which the routing nodes use in selecting neighboring routing nodes and parent routing nodes. For example, in one implementation, neighbor request packets can include one or more of the following attributes: 1) a type identifier (request v. response); 2) the MAC address of its parent routing node or requested parent; 3) an antenna identifier corresponding to the antenna used to transmit the request (antUp); 4) channel identifier corresponding to the channel on which the request was transmitted, 5) a network name (an optional parameter that can be used for logically separating routing nodes into separate mesh networks); and 6) the MAC addresses of any descendant routing nodes in the routing hierarchy (e.g., child nodes, grandchild nodes, etc.). Additionally, neighbor response packets can include one or more of the following attributes: 1) a type identifier (request v. response); 2) the detected SNR of the neighbor request packet (snrUp); 3) the detected receive error rate of the neighbor request packet; 4) mesh routing or path information; 5) the antenna identifier corresponding to the antenna on which the neighbor request was received (antDown); 6) the channel on which neighbor request was received (chanUp); 7) the MAC address of the intended potential child; 8) the network name; 9) the transmit antenna identifier advertised in the neighbor request (antUp); and 10) data slotting values used in the data slot scheduling module (see below). In one implementation, the data slotting values can include 1) a "slot early time" indicating an amount of time before a data slot by which a child routing node should begin changing its configuration to operate in that slot (e.g., changing channels, antennas, etc.); 2) a "slot dead time" indicating an amount of unused slot space at end of slot); and 3) a slot duration time. Still further, the mesh routing information can include: 1) the number of routes to one or more root APs; and 2) for each route: a) the number of hops to the root routing node, b) the unadjusted ease of the routing node (see below), and c) a distance vector of MAC addresses representing the hops in the route.

FIGS. 3A and 3B set forth the actions, protocol events, and module interfaces associated with a neighbor state machine according to one implementation of the present invention. As FIG. 3A illustrates, the neighbor state machine implemented on a given routing node can be in one of five states: 1) START, 2) SEEK, 3) SYNC, 4) AUTH, and 5) MAINT. The START state occurs when a routing node is powered on or otherwise restarted. As FIG. 3A illustrates, in the START state, the adjNull function resets various timers and enters the SEEK state. However, if the routing node is a root routing node (e.g., node 30 in FIG. 1), the adjNull function sets the neighbor state machine to the MAINT state.

In the SEEK state, a routing node attempts to discover its neighbor routing nodes. In one implementation, the routing node, switching across all available antennas, scans all available operating channels, broadcasting neighbor request packets and listening for neighbor response packets. The routing node also populates an adjacency data structure that includes attribute data characterizing the neighbor routing nodes it discovers during the SEEK state. Discovered data stored in the adjacency data structure can include the MAC address of the routing node, the signal to noise ratio detected in connection with packets received from the routing node, and the like. As FIGS. 3A and 3B illustrate, the routing node, in the SEEK state, operates in one frequency channel until adjTimer12 times out, and then switches to the next operating channel and broadcasts additional neighbor request packets to discover other potential neighbor packets. At the end of the SEEK state (e.g., when adjTimer11 times out), the routing node evaluates the neighbor routing nodes it discovered to identify a potential parent routing node with which to synchronize. If it does not identify a potential parent, the routing node re-enters the START state.

The SYNC state is directed to synchronizing with the parent routing node chosen during the SEEK state. In one implementation, the routing node transmits a directed neighbor request packet that requests that the destination routing node adopt it as a child routing node in the routing configuration hierarchy. In one implementation, the routing node continuously transmits these directed neighbor request packets until a synchronization timer times out. In both the SEEK and SYNC state, neighbor request packets are repeatedly transmitted. In one implementation, this is due to the fact that the target routing nodes may be servicing child routing nodes, or their own parent routing nodes, and therefore may be operating on a different operating channel or using an antenna that is not directed to the transmitting routing node. Thus, the transmitting routing node transmits multiple neighbor request packets under the assumption that the neighboring routing nodes will eventually detect some or all the packets and pass the packet(s) up the protocol stack for higher level processing. In one implementation, if the routing node fails to synchronize with the first selected routing node, it adds the routing node to a black list (in one implementation, by setting a flag in the adjacency data structure), deletes the current potential parent from the TP variable, and re-evaluates its discovered neighbors to choose another tentative parent (TP). As FIG. 3A shows, if the routing node fails to identify another tentative parent, it re-enters the START state. In one implementation, a successful synchronization causes the routing node to enter the AUTH state. In one implementation, the event that pulls the routing node from the SYNC state and into the AUTH state is the receipt of a directed slot announcement message (see below) that informs the routing node of the time slots during which the parent routing node intends to communicate with the instant routing node. However, other transmission scheduling algorithms may also be used; accordingly, other messages may pull a routing node into the AUTH state.

In one implementation, the AUTH state is optional. The AUTH state is directed to authenticating the security credentials (e.g., a digital signatures, certificates, etc.) of the parent routing node from the child routing node's perspective, as well as the security credentials of the child routing node from the perspective of the child routing node. As FIG. 3A illustrates, if the authentication succeeds, the neighbor state machine sets the tentative parent to the actual parent routing node and enters the MAINT state. If the authentication fails, the routing node selects another tentative parent (if possible) and attempts to synchronize with the selected parent.

A routing node can choose a potential parent from among the discovered neighbors in a variety of manners. In one implementation, a tentative parent routing node is chosen as a matter of policy. For example, a tentative parent can be chosen based on one to a combination of the following factors: 1) the number of hops to the root routing node, 2) the signal-to-noise ratio (SNR) across all hops to the root routing node, and the like. SNR provides an indication of a possible data rate across each hop, while the number of hops provides an indication of propagation and queuing delay (as well as channel bandwidth consumption). As discussed in more detail below, in one implementation, each routing node can implement an algorithm that balances these factors to screen out and/or select a tentative parent from the discovered neighbors. The exact manner in which a routing node selects a parent, however, is not critical to the present invention.

B.1. Neighbor Maintenance State

The following describes the protocol and operation of the MAINT state according to one implementation of the present invention. In the MAINT state, the routing node continues to broadcast neighbor messages in an effort to discover neighboring routing nodes and update the entries in its adjacency data structure relative to both newly discovered and known routing nodes. In addition, the routing node, in one implementation, also sends directed neighbor request packets to its current parent routing node, as well as a selected subset of previously discovered routing nodes. In one implementation, a routing node uses the information obtained from these discovery and maintenance operations to determine whether to continue operating with its current parent routing node. In one implementation, the routing node stays with its current parent routing node as long as certain criteria are met, such as signal quality, route metrics, and the like.

FIGS. 4, 5A, 5B, 6A and 6B illustrate how a neighbor packet is processed while a routing node is in the MAINT state. As FIG. 4 illustrates, upon receipt of a neighbor packet, the packet is examined for compliance with a set of protocol rules (502). If the neighbor packet deviates from the protocol rules it is discarded and a counter is incremented (508). Following these initial processing steps, processing of the message by the routing node depends on whether the neighbor message is a neighbor request or a neighbor response message (506). Section B.2., below provides a description of the format of neighbor request and response messages according to one implementation of the invention. Still further, using the signal attribute detection functionality associated with the backhaul wireless network interfaces, the routing nodes also record the signal-to-noise ratio corresponding to received neighbor messages. These SNR values are used, as discussed below, to compute various path metrics used to automatically configure the mesh routing hierarchy.

Figure 5B:
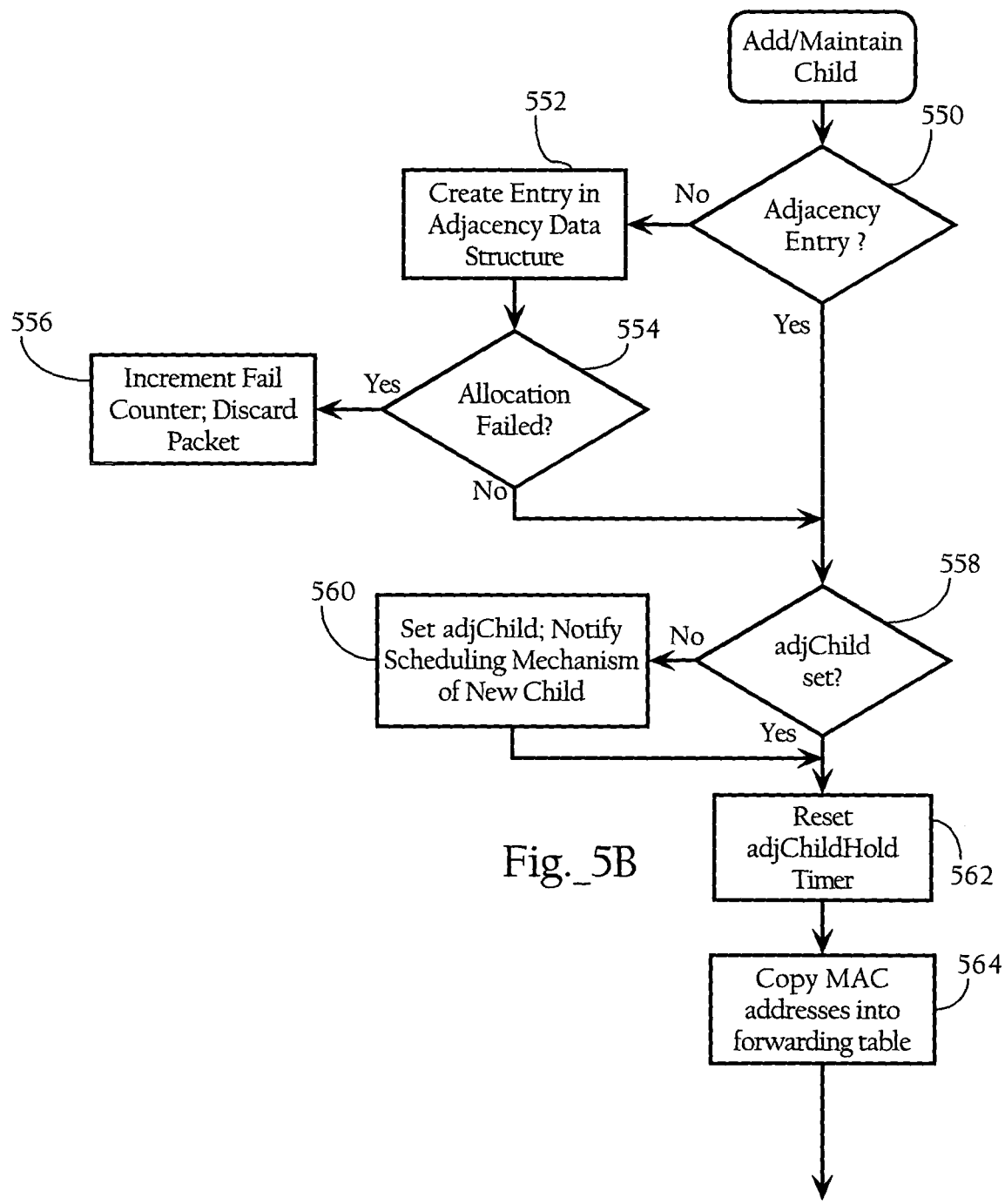
FIG. 5B is a flow chart diagram that illustrates a process, according to one implementation of the present invention, directed to adding and/or maintaining a child routing node.

FIGS. 5A and 5B together illustrate a method, according to one implementation, for processing a neighbor request message. As FIG. 5A illustrates, the routing node performs a series of checks during processing of the neighbor request. In one implementation, the routing node checks the state of its local variable adjNeighState (520). If this value is anything other than MAINT, the packet is discarded. The routing node then compares the channel on which the packet was received to the local variable adjDownChan to determine whether the packet was received on a channel assigned to its child routing nodes (522). If they are not the same, the packet is discarded. As FIG. 5A illustrates, the received SNR of the packet is compared to the constant adjMinNeighSNR (524). If the received SNR is less than this threshold, the routing node increments the counter adjPoorNeighSNR and discards the packet. Using the source MAC address in the neighbor request packet as a key, the routing node then looks up the corresponding adjacency entry, if any, in its adjacency database. If the entry is present, and the neighbor has the adjBlacklist variable set (526), the routing node increments the counter adjBlacklistPackets and discards the packet.

The routing node then compares the Parent MAC address contained in the neighbor request to its local MAC address. If they are the same, the routing node executes a process directed to adding or maintaining the requesting routing node as a child routing node. As FIG. 5B illustrates, the routing node looks up the source MAC address of the neighbor request to determine whether an entry exists in its adjacency data structure (550). If an adjacency entry does not exist for the child neighbor, then the routing node attempts to create one, along with resources necessary to maintain the routing node, using the source MAC address as the key. If the memory allocation fails (554), then the routing node increments a counter (adjInsufficientMemory) and discards the packet (556). Additionally, in some limitations, the routing node can include a configurable parameter limiting the number of child routing nodes that it maintains at any given time. If this threshold is met, the routing node discards the neighbor request message.

The routing node then checks the variable adjChild in the corresponding adjacency data structure entry to determine whether it has been set (558). If it has not been set, the adjChild variable for the entry is set and an adjNewChild event is transmitted to the transmission scheduling module to incorporate the new child node into the data slot transmission schedule (see below) (560). In one implementation, the routing node also resets a timer that is set to expire in adjChildHold seconds (562). If the timer expires the routing node clears or resets the adjChild variable, and transmits a child-deleted event to the transmission scheduling module to clear the child from scheduling. However, as FIG. 5B illustrates, the timer is reset (562) as long as neighbor packets from the child are received. Lastly, the routing node copies the set of MAC addresses contained in the neighbor request packet into the local forwarding table of MAC addresses (564). Other implementations are possible. For example, the transmission scheduling module can be configured to periodically poll the adjacency data structure to determine whether any child nodes have been added or deleted and adjust its scheduling operations accordingly.

Returning to FIG. 5A, if the parent MAC address in the neighbor request is not the same as the local MAC address of the routing node, the routing node then determines whether an entry exists for the routing node that transmitted the request. If any entry exists, the routing node determines whether the adjChild variable in the entry has been set (534). If so, the routing node clears the adjChild variable from the entry and transmits a child-delete event to the transmission scheduling module (536). As FIG. 5A shows the routing node increments the counter adjRxNeighReq (538), and a neighbor response packet is generated and transmitted to the sender (540).

As discussed above, the neighbor response packet includes information that allows the recipient routing node to compute various route metrics in connection with the selection of a parent routing node. For example, the neighbor response packet includes the SNR of the signal (snrUp) detected by the routing node during reception of the neighbor response packet. FIGS. 6A and 6B illustrate a process flow directed to processing neighbor response packets. In one implementation, FIGS. 6A and 6B illustrate a process executed by the NEIGHADD feature in the state diagrams discussed above. In this process, the routing node adds or updates entries in the adjacency data structure in response to receipt of the neighbor response packets. As FIG. 6A illustrates, the routing node performs a series of checks on the neighbor response packet. For example, the routing node first checks the state of the variable adjNeighState state (570). If its value is anything other than MAINT or SEEK, the packet is discarded. Next, the routing node checks its own role (572). For example, if the instant routing node is the root node, then the neighbor response packet is discarded. In addition, the destination MAC address of the packet is compared to the local MAC address of the instant routing node (574), and, if different, the packet is discarded.

The routing node then compares the number of hops corresponding to each route advertised in the neighbor response packet to an AP_MAXHOPS threshold (575). If any of the number of hops is greater than or equal to the AP_MAXHOPS threshold, the packet is discarded. In one implementation, the routing node then checks to make sure the receive antenna and channel, on which the response packet was received, represent a set serviced by the instant routing node (not shown); if not, the packet is discarded. Additionally, the routing node compares the receive antenna and channel, on which the response packet was received, to the transmit antenna and channel used to transmit the corresponding neighbor request packet (as identified in the response packet) (not shown), and if different the packet is discarded. Still further, the routing node then scans the distance vector(s) corresponding to the routes advertised in the response packet (576). If the local MAC address of the instant routing node is found in any of the distance vectors corresponding to the routes in the response (loop detection), the packet is discarded to prevent a routing loop.

The routing node then looks up the source MAC address of the neighbor response packet for a corresponding entry in the adjacency data structure (577). If the entry does not exist, then one is allocated along with resources necessary to service the adjacency (578). If the memory allocation fails (579), then the counter adjInsufficientMemory is incremented, and the packet is discarded. If the allocation succeeds, all management variables in the entry are initialized to 0 (580). In one implementation, the routing node them computes a linkSNR variable and compares it to a threshold value (582). In one implementation, linkSNR is set to the lesser of 1) snrDown (the SNR of the received neighbor response packet), and 2) snrUp+5 (the SNR value reported by the responding node and contained in the received neighbor response packet). If linkSNR is less than the threshold adjMinNeighSNR (582), the packet is discarded and the counter adjPoorNeighSnr is incremented. As FIG. 6A illustrates, if the adjacency entry has the adjBlacklist variable set (584), the counter adjBlacklistPackets is incremented, and the packet is discarded.

If the neighbor response packet passes the foregoing checks, the routing node then updates the adjacency entry corresponding to the transmitting routing node based on information from the neighbor response packet (585). Updating an adjacency entry, in one implementation, includes setting the variables adjChan, adjAnt, adjSNRUp, adjSNRDown, adjMACAddress, adjNumRoutes, and for each identified route, adjUnadjustedEase (see below), adjLinkSNR, adjVectors as indicated by the received adjacency packet. The variable adjUpdated is set to 1, and a potential parent (PP) timer is set to the constant adjCMaintTimer. The potential parent timer provides a lifetime for the adjacency entry relative to selection of a parent routing node. If the PP timer expires for a given entry, the adjUpdated variable is reset to 0, indicating that it should not be used in parent selection.

The routing node also updates the smoothSNR values stored for the entry in the adjacency data structure (590). In one implementation, for each entry in the adjacency data structure, there is a smoothSNRs matrix including SNR values for each antenna pair between the routing node that transmitted the neighbor request and the routing node that transmitted neighbor response. In one implementation, the routing node uses the antenna identifiers in the neighbor response message to determine which value in the smoothSNRs matrix to update. In one implementation, if the channel (adjChan) previously stored in the entry is different from the current channel on which the neighbor response packet was received (586), the routing node clears all values in the smoothSNRs matrix (588). In one implementation, the routing node computes a smoothSNR value for a given entry in the smoothSNRs matrix the following manner:

1) The set of per antenna adjacency smoothed SNRs is consulted. If the value for the corresponding antenna is 0, then $\frac{1}{2}$ of the computed adjlinkSNR (above) is stored in the management variable smoothSnrs as indexed by the antennas.

2) Otherwise $\frac{1}{32}$nd of the smoothed antenna value is subtracted, and $\frac{1}{32}$nd of linkSNR is added to the smoothSnrs value.

One skilled in the art will recognize, however, that the foregoing illustrates only one possible implementation and that other algorithms to smooth the SNR values can be used. As discussed more fully below, the smoothSNR values are used, in one implementation, to select a parent routing node.

B.1.a. Neighbor Evaluation (NEIGHE)

This section describes neighbor evaluation—i.e., the NEIGHE procedure—according to one possible implementation of the invention. Neighbor evaluation may occur several times in the state machine, such as when receiving the event adjTimerI1 in the SEEK state, in the SYNC state when receiving the event adjSeekFail, in the AUTH state when receiving the event adjAuthFail, and in the MAINT state when receiving the event adjTimerMN.

FIG. 6C illustrates a process flow, according to one implementation of the invention, directed to evaluating adjacency entries. In one implementation, the adjacency data structure is scanned and filtered against one to a plurality of criteria (602). The routing node, in one implementation, considers only the neighboring routing nodes that do not have the adjBlacklist and adjChild variables set. In the MAINT state, any neighbors that have not been updated (as evidenced by having the adjUpdated variable set to zero) are also excluded from consideration.

The routing node, in one implementation, maintains a table of routing nodes in the adjacency data structure, up to adjMaxNeighs, that have the best adjUnadjustedEase values (604, 606). The adjUnadjustedEase (ease of an adjacency), in one implementation, is calculated as follows: The highest SNR value in the smoothSNRs matrix for a given entry (see above) is used to calculate the ease of the link between the instant routing node and the routing node associated with the entry in the adjacency data structure. In one implementation, the routing node computes the adjUnadjustedEase value for each link corresponding to the qualifying entries in the adjacency data structure. The adjUnadjustedEase variable, in one implementation, is a quantity, computed from the highest smoothSNR values determined for the links between the routing nodes, that characterizes the effective data rate of a link in a path between a given routing node and the root routing node. For example, a link that exhibits a low SNR could provide a low data rate either by virtue of the poor SNR itself, or by the effective data rate resulting from a high error rate and consequent re-transmissions. Furthermore, the following table represents one possible implementation for computing the adjUnadjustedEase variable for a given link based on its adjlinkSnr value:

| SNR to adjUnadjustedEase Table | |
|---|---|
| smoothSNR =< 20 | $2 \hat{\ } linkSNR$ |
| smoothSNR > 20 | $2 \hat{\ } 20 + (linkSNR - 20) * 300000$ |

One skilled in the art will recognize, however, that other algorithms can be used to characterize the ease/effectiveness of a link. In the foregoing implementation, the algorithm used reflects a design choice that indicates that below a SNR value of 20, the error rate is a significant factor in determining an effective data rate (after retransmissions). As discussed more fully below, the adjUnadjustedEase variables are used in selecting a parent routing node.

Furthermore, the most constrained link in the path between a given routing node and the root routing node can occur any where in the path. Accordingly, the adjUnadjustedEase value computed for the link (604) to the routing node transmitting the neighbor response packet (see below) is compared to the unadjusted eases, corresponding to each route, reported in the neighbor response packet. In one implementation, the adjUnadjustedEase reported by the root access point is set by configuration to a value large enough to ensure that it will be greater than any computed value. In this manner, the adjUnadjustedEase values corresponding to the weakest links in the paths propagate throughout the routing node hierarchy. Then, for each route in each entry (608, 610), the lesser of the two adjUnadjustedEase values (i.e., either the link or reported route value) is then divided by (number of hops in the route +1) (612). The minimum resulting value across all routes in the adjacency entry is stored as adjAdjustedEase in the adjacency entry. The corresponding non-hops adjusted value is stored as adjUnadjustedEase in the adjacency entry (614). The routing node then ranks the adjMaxNeighs neighbors with by their respective adjAdjustedEase values and also sets them as neighbors. In one implementation, the routing node actively maintains the set of neighbor routing nodes, periodically transmitting unicast neighbor request packets to them. The routing node also selects the neighboring routing node with the highest adjAdjustedEase value as the tentative parent (616). If the selected tentative parent is not the same as the current parent, the routing node increments the counter adjParentChanges. An adjParentChange event is transmitted to the transmission scheduling module, and the state is set to SYNC.

Other implementations are possible. For example, the UnadjustedEase values reported by the current parent routing node in the neighbor response packet can be modified prior to being used in the process set forth above. For example, the UnadjustedEase for each route reported by the parent routing node can, using the inverse of the SNR to Ease algorithms set forth above, be converted back to a SNR value. The resulting SNR value can be increased by 20 percent, and then re-converted back to an unadjusted ease value. For example, assume an unadjustedEase for a route of 256. This can be converted to an SNR of 8. Adding 20% results in 10, which converted to the unadjustedEase of 2^10, or 1024. This biasing mechanism can be used to prevent the routing node from switching back and forth between two potential parent routing nodes that have similar path properties.

B.1.b. Transmit Request to Next Neighbor (TXNEXT)

The following describes the operation of the TXNext procedure according to one implementation of the present invention. TXNext runs in the MAINT state upon receipt of the event adjTimerMP, and the SEEK state upon receipt of the event adjTimerI2. The list of neighbors is scanned (note, there are no neighbors in the SEEK state). Each adjTimerMP, the list of neighbors is scanned to determine from which neighbor to attempt affirmative acknowledgement. Only unacknowledged neighbors are sent a request. Scanning is performed as follows: $N_0, N_1, N_0, N_2; N_0, N_3, N_0, N_4, N_0, N_5, N_0, N_1, \ldots$, one per adjTimerMP. The neighbors are ordered by adjAdjustedEase (see above): Accordingly, $N_0$, is the most desirable node, i.e., the parent, $N_1$ the next most desirable, and so forth. In one implementation, the routing node transmits neighbor request packets to the selected neighbor until an appropriate acknowledgement is received, at which time the slot for Nx is used for broadcast neighbor discovery. When sending to neighbors, the request packets are directly transmitted to the neighbor (i.e., the MAC address of the neighbor is used). If all neighbors have been acknowledged, then antennas and channels are scanned in a fair manner, and neighbor request packets are transmitted to the broadcast MAC address.

B.2. Neighbor Message Protocol Packets

The following illustrates the format of a neighbor request packet according to one implementation of the present invention.

| Neighbor Request Packet | |
|---|---|
| byte type and version | /* request-response type and version identifier */ |
| 6 bytes parent | /* MAC address of the parent routing node */ |
| byte antenna | /* Antenna on which request was sent */ |
| byte channel | /* Channel on which request was sent */ |
| 10 bytes netname | /* Network Identifier */; |

In the implementation shown, version is set to 0, type is set to 1 (indicating a neighbor request message), and parent is set to the MAC address of the parent routing node (0 if the routing node has no parent). Furthermore, the following sets forth the format of a neighbor response packet, according to one implementation of the present invention. The following table describes the values in the bytes of the packet according to one implementation of the invention.

| Neighbor Response Packet | |
|---|---|
| Byte type | version | |
| byte snr; | /* Received link snr */ |
| byte error; | /* Receive error rate */ |
| byte numRoutes; | /* Number of routes in the keepalive / |
| byte rxAntenna; | /* Antenna received in the adj request */ |
| byte channel; | /* Channel received in the adj request */ |
| 6 bytes child; | /* Child to which response is generated */ |
| 10 bytes netname; | /* Network Identifier */ |
| byte txAntenna; | /* Both RX and TX antenna for adj request */ |
| 2 bytes slotEarly; | /* pre-slot switching time */ |
| 2 bytes slotDead; | /* Dead time at the end of a slot */ |
| 2 bytes slotDuration; | /* Duration of slots */ |
| followed by a variable structure, one per route: | |
| byte number of hops | |
| 6 bytes of RAP | /* MAC address of Root Routing Node */ |
| 6 bytes of 1st hop | /* MAC address of 1$^{st}$ Hop Routing Node */ |
| Number of bytes in route | /* Number of bytes in distance vector */ |
| Distance Vector | /* MAC addresses of Routing Nodes in Route */ |

B.3. Constants, Counter and Variable Descriptions

The following tables set forth descriptions of the various constants, counters and variables used by one implementation of the present invention.

B.3.a. Constants

| | | |
|---|---|---|
| adjChildHoldExp | 10 | Seconds |
| adjMaxNeighs | 5 | |
| adjMinNeighSNR | 12 | |
| adjTimerPPtExp | 30 | minutes |
| adjTimerBlacklistExp | 10 | minutes |
| adjTimerI1Exp | 880 | centiseconds |
| adjTimerI2Exp | 5 | centiseconds |
| adjTimerMNExp | 10 | seconds |
| adjTimerMPExp | 30 | centiseconds |
| AP_REQUEST | 1 | |
| AP_RESPONSE | 2 | |
| AP_VERSION | 1 | |
| AP_MAXHOPS | 8 | |

B.3.b. Variables and Counters

| | |
|---|---|
| adjRAP | Whether this AP is a root AP (RAP) |
| adjMalformedneighPackets | Number of malformed packets received |
| adjNeighState | The state of the neighbor maintenance protocol, has values Start, Seek, Sync, Auth, and Maint. |
| adjDownAnt | The antenna pointing downward in the tree towards children |
| adjDownChan | The channel used to communicate with children |
| adjNextChan | Next channel on which to transmit broadcast request |
| adjNextAnt | Next antenna on which to transmit broadcast request |
| adjNextNeigh | Next neighbor to which to transmit adj request (not implemented in alpha) |
| adjCurAnts | Antennas currently selected by the adjacency state machine |
| adjPoorNeighSNR | Number of neighbor packets received with too poor SNR |
| adjParentChanges | Number of parent changes |
| adjBlacklistPackets | Number of neighbor packets received from blacklisted neighbors |
| adjNeighTimeout | Number of neighbors that have timed out. |
| adjInsufficientMemory | Number of times allocation for an adjacency failed |
| adjRxNeighReq | Number of neighbor requests received |
| adjAuthenicationFailures | Number of authentication failures |

B.3.c. Variables and Counters Specific to Adjacency Entries

| | |
|---|---|
| adjPermSNR | variable set by management action to fix an SNR to an AP |
| adjBlacklist | adjacency is on the blacklist |
| adjChild | neighbor is a child |
| adjSNR | variable set by management action to fix the SNR of the neighbor |
| adjSNRUp | SNR of the last received Neighbor Request packet. |
| adjSNRDown | SNR located in the last received Neighbor Response packet. |
| adjMACAddress | MAC address of the neighbor |
| adjNumRoutes | number of routes present in the received neighbor response packet |
| adjUnadjustedEase | unadjusted RAP ease received in the last neighbor response packet. |
| adjLinkSNR | the calculated SNR of the link |
| adjAnt | Antenna on which the neighbor packet was received |
| adjChan | Channel on which the neighbor packet was received |
| adjVectors | routes present in the last neighbor response packet. |
| adjUpdate | indicates that the adjacency has been updated since the list adjTimerMN event. |
| smoothSnrs | Per antenna smooth SNRS |
| adjLastUpdate | Time in seconds since 1970 GMT since a neighbor response packet was received. |

B.3.d. Events

| | |
|---|---|
| adjNull | Null event to spin the state machine |
| adjRxNeigh | Receive Neighbor Packet |
| adjSyncFail | Synchronization Failed |
| adjSyncSucc | Synchronization Succeeded |
| adjAuthFail | Authorization Failed |
| adjAuthSucc | Authorization Succeeded |
| adjQuit | Quit |
| adjTimerI1 | Evaluate neighbors and choose parent |
| adjTimerI2 | Transmit next neighbor request packet |
| adjTimerMN | Evaluate neighbors, perhaps choose new parent |
| adjTimerMP | Transmit neighbor request on next channel/antenna |
| adjTimerBL | Remove adjacency from the blacklist |
| adjTimerPP | Remove a potential parent |

| | |
|---|---|
| adjNewChild | A new child has been added to the list of children |
| adjChildDel | A child has been removed from the list of children |
| adjParentChange | Indication to the LLC that a parent change occurred |

C. Slot-Based Transmission Scheduling Mechanism

The following sets forth a slot-based transmission scheduling mechanism implemented by the nodes in the wireless mesh. In one aspect, each node implements a cycle interval comprising a fixed, uniform number of time slots. In one implementation, the cycle interval may include data slots and contention slots. As FIG. 8 illustrates, in one implementation, the cycle interval comprises a fixed, uniform number of data slots, followed by a fixed, uniform number of contention slots. In the implementation shown, there are 11 data slots; however, other configurations are possible. A data slot is a time slot dedicated to the uni-directional or bi-directional flow of traffic between a parent and child node. As discussed in more detail below, during a given data slot, a routing node communicates with only one other routing node (such as its parent routing node, or a selected child routing node). Furthermore, a routing node receives slot scheduling information from its parent node indicating when the parent has scheduled communications with it, and then uses this information to schedule its own child routing nodes. In one implementation, slot scheduling information is received at least once during each cycle interval, allowing the routing nodes to dynamically reconfigure their slot schedules to adapt to changing mesh topologies.

The use of contention slots is an optimization that serves several purposes, as described below; however, the use of contention slots are optional. That is, the use of contention slots may add latency; accordingly, their use is subject to a variety of engineering and performance considerations. First, contention slots allow a node that was unable to communicate with all of its children during the data slot portion of the cycle interval to perform directed communications with them, thereby ensuring all parents and children are serviced each cycle interval. Second, they allow a node with excess data communications to increase throughput during the cycle interval. Third, contention slots allow for the transmission of management or control traffic among node neighbors while still servicing all child and parent nodes each cycle interval. A given implementation need not include contention slots; however, that may mean that not all nodes will be serviced during each cycle interval.

C.1. Time Slot Schedules

FIG. 9 illustrates for didactic purposes part of a hierarchical wireless mesh comprising, in relevant part, a parent node P at a first level of the hierarchy, intermediate nodes N1, N2, N3 & N4 as child nodes of parent node P, and child nodes C1, C2, C3, C4 & C5 of node N1. Each node, and its child node(s), avoid permanent scheduling locks by scheduling child nodes independently of the parent node. However, the number of child nodes scheduled in a given cycle interval is relatively prime to the number of child nodes associated with the parent node to ensure that there are no loops between a parent node and a given child node where the parent node services its parent every time it should service that child node. Two numbers are relatively prime if they have no common factors. Thus, four and three are relatively prime, though four is not prime. In one implementation, a node having a parent node advertising four children will schedule five children, even though it has only four, for instance. Relatively prime numbers have a property that ensures there are no inner cycles within the larger cycle, which is the multiple of the two prime numbers. This property ensures that scheduling is fair and that no one child will be continually ignored as its parent node loops through the cycle interval.

FIGS. 10A and 10B illustrate how parent node P and its child node N1 schedule their respective data and contention slots according to one possible implementation of the present invention. At the beginning of each slot cycle, a given node determines its schedule for that cycle, and schedules its children and parent slots or antennas accordingly. Contention slots can be used to service missed child slots, schedule off channel neighbor discovery, and/or enhance data transfer for children with excess data. In one implementation, at the beginning of each cycle interval, a parent node schedules the slots in the cycle interval, and communicates to each child node the slot schedule and the effective number of its child nodes. Each child node, in turn, uses this slot scheduling information to compute its own slot schedule. For example, as FIG. 10A illustrates, parent node P has 4 child nodes, and no parent node (rather, it is directly connected to wireless mesh control system 20). Accordingly, it allocates the available data slots 1-11 evenly across its child nodes N1-N4. As FIG. 10A illustrates, during the next cycle interval, parent node P continues cycling through its child nodes. As discussed in more detail below, parent node P communicates this slot schedule as well as the number of effective child nodes to child node N1 (as well as other child nodes). Child node N1 uses this information to create its own slot schedule. As FIG. 10B illustrates, child node N1 schedules transmissions with its parent node P during slots 1, 5, 9 in the first cycle of data slots, by overlaying the slot schedule handed to it by its parent node over the data slot schedule that would result by cycling through all child nodes. In one implementation, each node re-computes its slot schedule when it receives slot announcement messages.

In one embodiment, slot numbers are derived from a circular address space. This address space is bounded by a number that allows all slot cycles to repeat, and is called for didactic purposes, the Slot Epic number. In one embodiment, the Slot number starts with 0 and ranges to the bounding slot epic number based on a multiple of the total number of cycles in the cycle interval, and possibly other factors such as the number of child nodes to which parent nodes are limited. In one implementation, the bounding number is 55440 (11*10*9*8*7). Thus, the slot number 55440 is not allowed; when the slot number reaches the epic number, it wraps around to slot number 0.

C.1.a. Effective Number of Child Nodes

As discussed above, each node computes an effective number of children for purposes of computing a slot schedule based on the number of children it actually has and the effective number of children advertised by its parent. As discussed above, scheduling fairness is ensured by maintaining a relatively prime relationship between the effective number of children between a parent node and a child node. In other words, this relatively prime relationship prevents a given child routing node of the present node from having its data slots repeatedly taken for communications with the parent node of the present node. In one implementation, each routing node consults the following table (or other data structure) to compute the advertised value of effective children based on the effective number of children advertised by its parent and its actual number of children. The left-hand column corresponds to the parent node's advertised effective number of children, the top row is the actual number of children a given node has, and each indexed cell is the number the node should advertise as its effective children.

| Effective Child Node Table | | | | | | | | | | | | |
| --- | --- | --- | --- | --- | --- | --- | --- | --- | --- | --- | --- | --- |
| PEC\#C | 1 | 2 | 3 | 4 | 5 | 6 | 7 | 8 | 9 | 10 | 11 | 12 |
| 2 | 2 | 3 | 3 | 5 | 5 | 7 | 7 | 7 | $7^1$ | 7 | 7 | 7 |
| 3 | 2 | 3 | 4 | 4 | 5 | 7 | 7 | 8 | 10 | 10 | 10 | 10 |
| 4 | 3 | 3 | 4 | 4 | 5 | 7 | 7 | 9 | 9 | 9 | 9 | 9 |
| 5 | 2 | 2 | 3 | 5 | 6 | 6 | 7 | 8 | 9 | 9 | 9 | 9 |
| 6 | 5 | 5 | 5 | 5 | 6 | 7 | 7 | 7 | 7 | 7 | 7 | 7 |
| 7 | 2 | 2 | 3 | 4 | 5 | 7 | 8 | 8 | 9 | 10 | 10 | 10 |
| 8 | 3 | 3 | 3 | 5 | 5 | 7 | 8 | 9 | 9 | 9 | 9 | 9 |
| 9 | 2 | 2 | 4 | 4 | 5 | 7 | 7 | 9 | 10 | 10 | 10 | 10 |
| 10 | 3 | 3 | 5 | 5 | 5 | 7 | 7 | 9 | 10 | 9 | 9 | 9 |

[1] One might think that this should jump to relatively prime "9." However, this could cause more than 3 child nodes to be allocated less data slots that other nodes in a given cycle interval.

As the illustrates, in some instances, the effective number of children is greater than the actual number of children. In this instance, the node nevertheless computes the data slot schedule according to the effective number of children to maintain the relatively prime relationship discussed above. In one implementation, data slots corresponding to a "phantom" child node are essentially dead slots as there is actually no child node with which to communicate. In some implementations, the routing node may perform other operations during phantom data slots, such as scanning its coverage area to potentially acquire additional child nodes, broadcasting neighbor request packets and the like. Furthermore, in some implementations, a routing node, by configuration, is limited to acquiring no more than N child nodes, where N is a configurable parameter (e.g., 5, 7, etc.). If more than N child nodes are acquired, the routing node drops one based on various criteria, such as relative signal strength, SNRs, and the like. In addition, when a routing node acquires a new child node, it creates a new slotting schedule at the beginning of the next cycle interval.

This scheme may also be optimized under certain circumstances. For example, if a node's parent (P) has two child nodes, and the node itself has two children (C1 & C2), the routing node can configure a cycle of four nodes and schedule the data slots in the following manner: P, C1, P, C2, P, C1, P, C2 . . . Otherwise, using the scheme set forth above, the data slots may be scheduled as follows: P C2 P C1 P X P C2 P C1 P X . . . , where X is a dead slot. Accordingly, the above scheme may replace the prime number relationship discussed above to optimize the efficiency of the slot scheduling mechanism.

C.2. Slot Schedule Operation

At each cycle interval, a routing node determines its transmission schedule for that cycle interval, and schedules its children and parent slots accordingly. In one implementation, a routing node may also recomputed its transmission schedule upon receipt of new information in a slot announcement packet from a parent routing node. In addition, the following variables are determined at the beginning of each cycle: 1) the number of effective children, and 2) the slots that each child node uses. This information is transmitted to the child node in slot announcement packets or PDUs. In one implementation, clock synchronization across routing nodes is accomplished by a parent node transmitting a time stamp to its children in slot announcement packets, as discussed more fully below. The child receives the slot announce packet, and marks the time it received the packet. The over the air time is calculated as the time to transmit the packet and demodulate and receive the packet. The receive time and transmit time are compared, and the two clocks can then be synchronized, as adjusted by the time to transmit and receive the packet.

For the wireless mesh to operate efficiently, it is desirable to provide for precise timing across the routing nodes. In one implementation, slot announcement packets contain slot scheduling information that allows a recipient child node to compute a slot schedule and maintain timing synchronization with its parent node. Slot announcement packets include a high resolution time stamp which, in one embodiment, is based on the Timing Synchronization Function (TSF) timer implemented in the IEEE 802.11 WLAN specification, which is a 64-bit high resolution timer. In one implementation, the slot announcement packets include: 1) the time of the TSF timer that the packet was transmitted, 2) 16 bits of what the local TSF timer should read for the slot start time, 3) the time (in microseconds the child node is permitted to use for data transfer, 4) the current slot number in the circular slot number sequence space, 5) the effective number of child nodes and the start position of the child node relative to the epic slot number "0"; 6) the actual number of child nodes and the start position of the child node relative to the epic slot number "0"; and 7) the mini-slot number in which the slot announcement packet was transmitted. The slot announcement packet may include other information as well, such as the amount of data buffered for the child node; the number of children allocated to the slot (1 for data slots, and equal to or greater than 1 for contention slots); and the number of microseconds of transmission time allocated to the child node in the next slot. In one embodiment, when a routing node transmits a slot announcement packet, it queues the slot announcement packet along with the lesser of 1) any data packets destined for the child node and 2) the number of packets the node may transmit without exceeding the amount of time in the data slot accounting for the amount of transmission time allotted to the child node in the previous slot announcement packet. The routing node uses the acknowledgment frame transmitted by the child node in response to the slot announcement packet to begin sending any queued data frames. In some implementations, the parent routing node need not transmit slot announcement frames at every data slot. In one implementation, the slot announcement frame is transmitted if 1) the child node has requested an allotment of data to transmit to the parent routing node; 2) the parent has data to transmit to the child node; or 3) the parent routing node should transmit a slot announcement packet so that the child node will not time out or otherwise lose synchronization with the parent routing node.

Child routing nodes may transmit slot response frames to their respective routing nodes. In one embodiment, child routing nodes transmit slot response frames to parent nodes periodically as keep-alive messages to the parent node, and whenever a child node has significant amounts of data to transmit to its parent routing node. Slot response frames can include the following information: 1) microseconds of queued data, and 2) the slot number. At the beginning of a slot in which a child node is meant to communicate with its parent, it selects the antenna oriented towards its parent. If the node has data to transfer, it queues a slot response frame along with data that may be transmitted in the slot. The mini slots are used to allow contention between other interfering nodes in the same physical sector that are synchronized to the same slot and to ensure that no one routing node always gains access to the data slot. The node then awaits a slot announcement from its parent. Upon receipt of the announcement, the node copies the slot announcement information into its parent adjacency, and updates its slot start time. The routing node also marks its parent adjacency as having been serviced.

FIG. 11A illustrates a process flow, according to one implementation of the present invention, directed to the slot scheduling and data transmission process implemented by the routing nodes. At the beginning of each cycle interval, a node clears all flags in its adjacency data structure (302), and computes the data slot schedule for the current cycle interval (304). The node then cycles through each data slot according to the computed schedule (see FIG. 11B) (306). In one implementation, each node then proceeds through a contention slot cycle (312). In the implementation shown, each node scans its adjacency data structure to determine whether any child nodes were not serviced during the data slot cycle and schedules the child nodes during the contention slot cycle (308). In addition, the routing node scans the adjacency data structure to determine whether it was serviced by its parent node during the data slot cycle and schedules data transfer with its parent during the appropriate contention slot cycle (310).

As FIG. 11A illustrates, after each cycle interval, each routing node determines whether it received a slot announcement message from its parent node (320). If so, the routing node resets a re-sync counter (322). If not, the routing node increments the re-sync counter (324). If the routing node does not receive a slot announcement message within a threshold (th1) number of cycles (326), the routing node enters a re-synchronization phase to re-acquire a parent node (328), see below.

B.2.a. Data Slot Cycle

FIG. 11B illustrates the process flow, according to one implementation of the present invention, during the data slot phase of a cycle interval. As discussed above, a given node can communicate with a parent node or a child node during any given data slot. In one implementation, where a routing node has more than one antenna, it selects an antenna associated with the routing node with which it will communicate during the next data slot (352). As FIG. 11B, the remainder of the process flow for each data slot depends on whether the node communicates with a parent or a child node (354). During the beginning of a data slot, a parent node transmits a slot announcement message or frame to mark the beginning of the data slot (356). In one implementation, during the beginning of a data slot, the parent node transmits a slot announcement frame (see above) which is a directed or unicast packet to the child node scheduled in the data slot. During a contention slot (see below), the slot announcement frame is broadcast. As discussed above, the slot scheduling information in the slot announcement packet allows the child node to determine during which slots the child should attend to data transfer with the parent node.

In one implementation, upon receipt of a slot announcement frame (364), the child node transmits a slot acknowledgment to its parent (365). Upon receipt of the slot announcement frame, the child node copies the slot scheduling information in the slot announcement frame into its parent adjacency data structure, and updates its slot start time (366). In one implementation, the node marks its parent adjacency as having been serviced for that cycle interval. The slot announcement acknowledgement, in one implementation, may include the amount of data the child has to transmit, and by extension a value of 0 indicates that flow control is in effect. In one implementation, the data flow control bit is set when a node has too much data in the aggregate to transmit to its parent and children, and therefore is running out of buffer space. Routing nodes do not transmit data to other nodes that have this bit set in the slot announcement or acknowledgment packets, which they transmit.

As FIG. 11B illustrates, the parent node uses the slot announcement ACK to set a flag corresponding to the child node in its adjacency data structure (360). In addition, receipt of the slot announcement ACK also marks the beginning of transmission of queued data to the child node during the data slot (362, 368), as discussed more fully below. After transmitting the acknowledgement, the child node, in one implementation, is also free to transmit to its parent, subject to flow control constraints.

In one implementation, a routing node can determine its next parent data slot, as well as the next data slots for its child routing nodes as follows. Let Sn be the schedule number of the routing node closest to slot zero in the circular slot sequence space. If scheduling a parent, this is the slot number in the slot announce packet, otherwise it is the slot number assigned by the node to the child (e.g., slot 0 of effective number of children, slot 1 of effective number of children, etc.). Furthermore, let Cs be the current slot number. The routing node then computes Cc as the current slot cycle number as follows:

$Cc = Cs \ \text{div}(\text{\# data slots per cycle} + \text{\# contention slots per cycle})$ The routing node can compute Cd, the beginning data slot number at the start of the cycle as:

$Cd = Cc * (\text{\# data slots per cycle})$

Furthermore, let Cn equal the cycle number for either the parent routing node or a child routing node. When scheduling a parent, Cn is the number of children the parent advertises in the slot announce frame. For the child routing nodes, Cn is the number of effective children advertised to them. The last cycle schedule (Ls) is computed as follows:

$Ls = Cd - Cd \ \text{modulo} \ Cn$

The next slot at which to schedule then becomes:

$Ns = Ls + Sn + Cn, \ \text{if}(Ls+Sn) < Cd; \ \text{otherwise} \ Ns = Ls + Sn.$ Thus, Ns is the next data slot in which to schedule the node (child or parent), Ns+Sn is the data slot in the next cycle, Ns+2Sn is the data slot for the next, and so on. Of course, if contention slots are not used; this scheduling algorithm should be modified accordingly.

C.2.a.1. Anatomy of a Data Slot

FIGS. 12 and 13 illustrate the major components and anatomy of a data slot. Each data slot, in one implementation, is large enough for a routing node, at the expiration of a previous data slot, to switch antennas to a parent or child node, transmit or receive a slot announcement frame, and transfer data. In one implementation, the mini-slots are used to manage interference across routing nodes in a given area or sector. In one implementation, mini-slot duration spans the time to transmit a slot announcement frame, plus propagation delay to transmit the frame to the maximum range at which the frame may be received, and the amount of time to process the frame and suspend transmission. In one implementation this time is set to 20 microseconds; however, other mini-slot durations can be configured. A routing node determines the mini-slots during which it begins transmission on a random basis. For example, the routing node may employ a random number generator to select a mini slot. Mini-slots can be used to randomize access into the slot between nodes in the sector that are synchronized to the same slot and, in one implementation, are meant to ensure that no single node always gains access to the data slot. For example, the use of mini-slots allows a given routing node to defer to another node that has an earlier mini-slot. In a network including omni-directional antennas, the number of mini-slots is increased significantly to handle the greater number of potential interferers. The delay (in one implementation, a 20 microsecond delay) between parent and child mini-slots is used in some implementations to prevent accidental swapping of start times. Based on experimental results, there appears to be some observed jitter in the slot starting time. Therefore, a 20 microsecond delay makes the swap less likely. The cost of this happening is not great; however, it is undesirable. Mini-slots, however, may be used in connection with other algorithms and processes. The slot guard dead time at the end of the slot is to help prevent slot overruns. The antenna switch time allows for the radio to be prepared to receive and transmit in the new slot. This step is just dead time in an omni-directional antenna setup; and thus can be set to zero.

FIG. 13 illustrates data transfer within a data slot between a parent and child node, according to one implementation of the present invention. Parent and child nodes cover their entire data transfer time by issuing an RTS frame that includes the entire delay for transmitting all packets they are sourcing during the data slot. During the data slot, data packets are transmitted only requiring an ACK. The ACK is used to determine whether or not the packet was successfully transmitted to the destination routing node. Packets that are not acknowledged are re-queued for later transmission.

Both the child and parent routing node are allowed to transmit data during a slot. However, if the child and parent node both transmit a full slot's worth of data, the slot will overrun. Therefore, an intra-slot contention model is adopted, that includes a mechanism to communicate requirements and available slot time, and a policy that decides how much bandwidth to allocate. The mechanism allows a child to request bandwidth (field requestedMicros in the slot acknowledgement packet) for the slot after next, and the parent to grant bandwidth (field PermittedMicros in the slot announcement packet) two slots away (these values are present in the slot acknowledgement and slot announce packets respectively). The parent routing node makes policy decisions, including such factors as current load, attempts to pack slots with uni-directional traffic, and gives a slight precedence to download traffic. A parent node performs whatever calculation it deems appropriate to determine how many microseconds to offer its child node. In the absence of the 802.11 slot announce ACK, or if the during the last slot the node did not transmit a slot announce packet to the child, the node assumes the child will transmit up to the default amount of data into the slot. Nodes use such factors as how much traffic the child node would like to send, the last time the child had an opportunity to send data, etc. to determine how much of the slot the child node may use.

Other implementations are possible. For example, in another implementation, the parent routing node need not transmit a slot announcement packet, in each data slot, with the child nodes. In one implementation, the routing node protocol discussed is configured such that a parent routing node communicates with each child on the order of once or twice per second. This is usually sufficient to keep the clocks in synchronization. Routing nodes may transmit slot announcement packets on a periodic or semi-regular basis to ensure that clock drift does not become significant, and/or to ensure that a child node does not consider the parent node to have been de-activated or lost timing. Routing nodes may also transmit slot announcement packets in response to an indication that the child node has requested a volume of data transfer in an amount greater than a default data volume.

C.2.b. Contention Slot Cycle

In embodiments that use contention slots, at the end of the data slot cycle, a parent node scans its adjacency data structure for disrespected children (i.e., those children allocated fewer data slots in the last cycle interval), or those children that it did not communicate with in the last data slot cycle. If the parent finds that it did not service a child node, it then forces itself to be available during at least one of contention slots twelve, thirteen, and fourteen, or fifteen, sixteen, and seventeen depending on the level the node is in the tree. In one implementation, when (level modulo two) is zero, the parent node is present during for the child node on one of contention slots twelve, thirteen, and fourteen, otherwise during slots fifteen, sixteen, and seventeen. In one implementation, levels in the tree are numbered starting at zero for the highest node, and continuing on to one for nodes connected to the highest node in the hierarchy, and so on.

At the end of a data slot cycle, child nodes check their parent adjacency to determine whether they were serviced in the last data slot cycle. If they were not, they check (parent level modulo two), and if this quantity is zero they attempt communication with their parent during cycles twelve, thirteen, and fourteen (otherwise at slots fifteen, sixteen, and seventeen). A child may elect to schedule itself during the contention cycles towards its parent, particularly if either it or its parent has additional data to communicate. First level nodes (e.g., nodes N1, N2), additionally may consume slots twelve, thirteen, and fourteen should they have serviced all of their children, and should they have additional data transfer with the parent or vice versa.

In one implementation, a parent routing node wishing to communicate during a contention slot cycle awaits the beginning of the slot, and issues a broadcast availability announcement. Child nodes receiving this announcement acknowledge their parent, and transfer available data. Nodes that have no children they disrespected and no parents with whom they lacked communications, are free to either attempt additional data transfer during the contention phase with either children or parent, or to attempt neighbor discovery and acquisition on other channels.

At the beginning of a slot cycle, a node determines the disposition of the contention slots. If the data slots are so scheduled that the set of parents and children are all serviced, the node may elect to use all of the contention slots for discovery. This decision is made at the beginning of the slot cycle. If so, all of the contention slots are consumed and that is their scheduling. Discovery runs once every n slots, where n (in one possible implementation, is four).

A routing node may use its child contention slots according to the following preferences.

1. The node schedules any un-serviced or disrespected children.
2. The slots are scheduled for neighbor acquisition and discovery.
3. The set of BAP parent nodes and child nodes of a parent are aggregated, and the child contention slots are scheduled slot by slot to service the nodes with the greatest data transfer need. (In that case, the slot is treated as a contention slot and so the announcement is broadcast.)
4. The slot is scheduled in either a random or round robin antennas selections as contention slots.

Parent contention slots are scheduled with the following priorities: If the slots have been dedicated to neighbor discovery, the parent slots are used for that purpose. Otherwise, the routing node selects the antenna oriented towards its parent, and listens for slot announcement packets. Upon receipt, if the parent has no data to transmit, and the child has no data to transmit, and the announcement is multicast, the announcement is ignored. Otherwise, the child transmits a directed slot announcement acknowledgement, and data transfer may commence.

D. Mitigation of Synchronization Loss

As discussed above, a routing node synchronizes with a parent routing node during the SYNC state. During the SYNC state, the routing nodes selects an antenna directed toward its parent node, transmitting requests to the parent node, and monitors for a slot announcement message. In one implementation, the routing node, in the SYNC state, waits for a slot announcement message for up to four cycle intervals. In addition, the routing node, during this time, periodically transmits directed neighbor request packets to its parent routing node. If, after four slot cycles, the routing node has not received a slot announcement message and acquired its parent routing node, it places the parent on a black list and selects another tentative parent. As discussed above, if the routing node identifies another tentative parent, it re-enters the SYNC state. Assuming it acquires a parent node, the routing node enters the MAINT state and recreates its slot schedule. Otherwise, the routing node enters the START state to gather additional adjacency information.

A given routing node may lose synchronization with its parent node for a variety of reasons. For example, the parent routing node may have gained or lost a child node, which causes the parent to re-compute its slot schedule. The new slot schedule may prevent the child node from receiving slot announcement messages from the parent. Other reasons for synchronization loss may be caused by a hardware failure on the parent routing node, or by the parent node being taken out of service. Furthermore, environmental changes, such as a new source of RF interference may cause a child routing node to lose synchronization with its parent node.

In one implementation, a routing node detects a change (such as a node failure) in its parent routing node, if it does not receive a slot announcement message after eight cycle intervals. During this time, the routing node continues to execute the current slot schedule and communicates with its child nodes, transmitting any queued data and receiving data from the child nodes. At the end of the eight-slot cycle period (see FIG. 11A, Ref No. 326), however, the routing node selects an antenna oriented toward its parent node and re-enters the SYNC state. As discussed above, and as FIG. 7 shows, the routing node transmits neighbor request packets to the parent routing node (702), and waits for a response from the parent routing node, in one implementation, for four cycle intervals (704, 706). As discussed above, if the parent routing node fails to respond, the routing node blacklists the parent (708) and chooses another tentative parent, if any<with which to attempt synchronization (710, 712). During the SYNC state, the child nodes of the routing node also detect a change since they cease to obtain slot announcement messages from the routing node. Like the instant routing node, however, the child nodes wait 8 (Th1) cycle intervals before re-entering the SYNC state.

After the routing node enters the SYNC state, it either re-acquires its parent routing node (in which case it begins again to transmit slot announce messages to its child node(s)), or it seeks to obtain a new parent. In the latter case, the routing node acquires a new parent, and begins transmitting slot announce packets to its child node(s) again. In this case, there may be no further disruption of the mesh network unless the slot cycles have changed. If so, the child nodes repeat the process, but the lower portion of the tree remains in its original form unless there are further topological changes indicated, which will occur based on the adjacency protocol.

FIG. 16 illustrates the timing of the actions taken by a routing node as it detects a change in its parent routing node and ultimately enters the SYNC state. Specifically, FIG. 16 shows a routing node that loses its parent, is unsuccessful in re-acquiring the parent, is unable to acquire a second parent, but ultimately is successful with a third routing node. The lower portion of FIG. 16 illustrates the effect of these actions on the child node of the instant routing node.

As the foregoing illustrates, by configuring the parent failure timeout (here, eight cycle intervals) to be greater than the acquire timeout (here, four cycle intervals), the effect of synchronization loss on the overall mesh network is reduced or mitigated. For example, if a routing node re-acquires its parent node, the lower portion of the hierarchical mesh will remain in its current state, unless a topology or data slot schedule change occurs. For instance, if it takes 12 cycles to time out a parent node, but only four to acquire a new parent, then a routing node that loses its parent node, but reacquires that parent node or another, will not lose its child node(s). In addition, one skilled in the art will recognize that other implementations are possible. For example, the failure and acquire timeouts can be tracked relative to timers separate from the cycle interval. In addition, the 2:1 ratio between the failure and acquire time outs is used for purposes of illustration. Other ratios can be employed. One of ordinary skill in the art will recognize that the absolute and relative configurations of the failure and acquire timeouts is a matter of engineering choice.

E. Mesh Routing

In one implementation, mesh network control system 20, as well as each routing node includes functionality supporting mesh network routing operations. In one implementation, uplink and downlink routing information is dynamically configured according to a route discovery process detailed below. In addition, one of ordinary skill in the art will understand that the routing algorithms described below are intended for didactic purposes to illustrate operation the present invention in one possible mesh network implementation. Accordingly, other routing algorithms and processes can also be used.

Mesh network control system 20, in one implementation, is configured with all routes that define the hierarchical mesh network configuration. Mesh network control system 20, in one implementation, composes and transmits, for each hierarchical tree, route discovery packets, including routing information, to the leaf routing nodes 34 on each branch of a given tree. In addition to the neighbor discovery processes described above, the routing nodes in the path to the leaf routing nodes 34 may also learn the identity of their respective parent and child routing nodes as the route discovery packet traverses the mesh network. For example in one implementation, a route discovery packet includes a Message Routing Header 204 including the route to a leaf routing node 34. Upon receipt of a route discovery packet, routing node 1 sends it to the next hop identified in the message routing header. As these route discovery packets traverse the hierarchy of routing nodes to the leaf routing nodes 34, the routing nodes in the path record the information in the Message Routing Header. FIG. 14 illustrates some of the headers in a wireless frame transmitted between routing nodes. FIG. 15 illustrates a Message Routing Header according to one implementation of the present invention. As FIG. 14 illustrates, the wireless frame, in one implementation, is an 802.11 frame including an 802.11 header 202 encapsulating a Mesh Routing Header (MRH) 204. Other headers can include 802.3 or other link layer headers for use by the last hop routing node, as discussed more fully below, and IP headers 208.

In this manner, the routing nodes in the mesh network learn the MAC addresses of their parent and child routing nodes, as well as the route and hopcount along the path from the root routing node 30 to the leaf routing node 34. The information in the MRH of the route discovery packet allows the routing nodes to properly route wireless frames in the uplink direction. Use of route discovery packets in this manner obviates the need to manually configure uplink and downlink MAC addresses at each routing node. In addition, mesh network control system 20 can dynamically reconfigure the routes in the hierarchical mesh network simply by composing MRHs that define the desired routes and transmit them in route discovery packets to the leaf routing nodes 34. In one implementation, the leaf routing node 34 simply discards the route discovery packet. In another implementation, when the route discovery packet reaches a leaf routing node 34, the leaf routing node 34 records the MRH information, clears the MRH, and transmits the route discovery packet uplink to mesh network control system 20. As the route discovery packet traverses the mesh network in the upstream direction, the routing nodes at each hop add their MAC address to the MRH and route the packet to an upstream routing node using a least cost or other routing algorithm. In this manner, the mesh network control system 20 can learn new routes and possibly apply them by sending route discovery packets in the downstream direction.

As discussed above, in one implementation, each packet sent or received at the mesh routing control system 20 to or from a routing node hierarchy is encapsulated with a Message Routing Header (MRH) that contains the path to the destination. FIG. 15 illustrates a Message Routing Header according to an implementation of the present invention. The "D" in the control word indicates whether the route is read from the top or bottom. In one implementation, uplink routing from a wireless client to network 50, for example, is static and based on the Message Routing Header information recorded by the routing node during processing of route discovery packets. In one implementation, a routing node receiving a wireless frame performs one of the following operations: 1) stripping the 802.11 header and Message Routing Header and passing the packet to the WLAN interface, if the final MAC hop identified in the MRH is the processing routing node; and 2) updating the destination MAC address in the 802.11 header 202 with the next hop MAC address in the MRH, and placing the packet in an appropriate upstream or downstream queue for subsequent transmission.

Mesh network control system 20, in one implementation, adds and strips off the Message Routing Header for all packets going to or coming from a hierarchical tree in the mesh network. Mesh network control system 20 is also operative to bridge wireless traffic from the mesh network onto network 50. In one implementation, the mesh network control system 20 includes a graphical user interface (GUI) to assist in mesh organization, statistics gathering and route monitoring. In addition, in order to select routes downlink for wireless frames destined for wireless clients 40, mesh network control system 20 is operative to monitor to which routing node each wireless client is associated. In one implementation, each routing node can be configured to transmit a notification, such as an SNMP trap, to mesh network control system 20 after a wireless client associates with access point functionality of the routing node. In another implementation, mesh network control system 20 can detect new wireless client MAC addresses in the data flows that traverse the mesh network control system 20. Further, in one implementation, all wireless client traffic emanating from a wireless client 40 is first transmitted uplink to mesh network control system 20, which may apply policies to the traffic, before the wireless traffic is transmitted back downlink to another wireless client. Lastly, mesh network control system 20 may include interfaces and associated functionality that facilitate management and operation of the WLAN access point functionality at the routing nodes.

The invention has been explained with reference to specific embodiments. For example, although the embodiments described above operate in connection with IEEE 802.11 network protocols, the present invention can be used in connection with any suitable wireless or wireline network protocol. In addition, although the embodiment described above includes a single mesh network control system 20, other implementations of the present invention may incorporate the functionality of mesh network control system 20 into separate devices for each hierarchical tree. In addition, the functionality of mesh network control system 20 may be integrated into other network devices, such as root routing nodes 30. Other embodiments will be evident to those of ordinary skill in the art. It is therefore not intended that the invention be limited except as indicated by the appended claims.

What is claimed is:

1. In a routing node for use in a hierarchical mesh network, wherein the routing node is operative to implement a data slot transmission schedule controlling transmission of data between a parent routing node and at least one child routing node, a method for scheduling data transfer, the method comprising receiving, at the routing node, slot scheduling information from a parent routing node, wherein the slot scheduling information indicates one or more time slots during which the parent routing node has scheduled communications with the routing node; and computing, for the routing node, a data slot transmission schedule that indicates time slots for transmission of data between the parent routing node and at least one child routing node based on the slot scheduling information received from the parent routing node and the number of child routing nodes associated with the routing node, such that the number of child routing nodes associated with the routing node scheduled in any cycle of the data slot transmission schedule is relatively prime to the number of child nodes associated with the parent routing node scheduled in the same cycle of the data slot transmission schedule.

2. The method of claim 1 further comprising deriving slot scheduling information from the computed data slot transmission schedule; and transmitting the derived slot scheduling information to the at least one child routing node.

3. The method of claim 1 wherein the slot scheduling information received from the parent routing node comprises a slot identifier and an effective number of child nodes associated with the parent routing node.

4. The method of claim 3 wherein the slot scheduling information further comprises the actual number of child nodes associated with the parent routing node.

5. The method of claim 2 wherein the slot scheduling information received from the parent routing node comprises a slot identifier and an effective number of child nodes associated with the parent routing node; wherein the method further comprises computing an effective number of child nodes based on the actual number of child nodes associated with the routing node, the slot identifier received from the parent routing node, and the effective number of child nodes associated with the parent routing node; and wherein the data slot transmission schedule is based in part on the effective number of child nodes computed by the routing node.

6. The method of claim 1 wherein the slot scheduling information further comprises a time stamp; and wherein the method further comprising synchronizing implementation of the data slot transmission schedule based at least in part on the time stamp.

7. The method of claim 1 further comprising deriving slot numbers for the time slots of the slot scheduling information based on a circular address space, the circular address space being bound by a number that allows all slot cycles to repeat.

8. The method of claim 1, wherein the data slot transmission schedule ensures that none of the at least one child routing node is continually ignored by the routing node.

9. The method of claim 1, wherein the data slot transmission schedule ensures that there is no loop between the parent routing node and any one of the at least one child routing node.

10. A routing node for use in a hierarchical wireless mesh network, comprising
- a network interface;
- one or more processors;
- a memory;
- a routing node application, stored in the memory, comprising instructions operable to cause the one or more processors and the apparatus to
  - receive slot scheduling information from a parent routing node, wherein the slot scheduling information indicates one or more time slots during which the parent routing node has scheduled communications with the routing node; and
  - compute a data slot transmission schedule that indicates time slots for transmission of data between the parent routing node and at least one child routing node based on the slot scheduling information received from the parent routing node and the number of child routing nodes associated with the routing node, such that the number of child routing nodes associated with the routing node scheduled in any cycle of the data slot transmission schedule is relatively prime to the number of child nodes associated with the parent routing node scheduled in the same cycle of the data slot transmission schedule.

11. The routing node of claim 10 wherein the routing node application further comprises instructions operable to cause the one or more processors and the apparatus to
- derive slot scheduling information from the computed data slot transmission schedule; and
- transmit the derived slot scheduling information to the at least one child routing node.

12. The routing node of claim 10 wherein the slot scheduling information received from the parent routing node comprises a slot identifier and an effective number of child nodes associated with the parent routing node.

13. The routing node of claim 12 wherein the slot scheduling information further comprises the actual number of child nodes associated with the parent routing node.

14. The routing node of claim 11 wherein the slot scheduling information received from the parent routing node comprises a slot identifier and an effective number of child nodes associated with the parent routing node; and wherein the routing node application further comprises instructions operable to cause the one or more processors and the apparatus to
- compute an effective number of child nodes based on the actual number of child nodes associated with the routing node, the slot identifier received from the parent routing node, and the effective number of child nodes associated with the parent routing node; and wherein the data slot transmission schedule is based in part on the effective number of child nodes computed by the routing node.

15. The routing node of claim 10 wherein the slot scheduling information further comprises a time stamp; and wherein the routing node application further comprises instructions operable to cause the one or more processors and the apparatus to
synchronize implementation of the data slot transmission schedule based at least in part on the time stamp.

16. The routing node of claim 10 wherein the routing node application further comprises instructions operable to cause the one or more processors and the apparatus to derive slot numbers for the time slots of the slot scheduling information based on a circular address space, the circular address space being bound by a number that allows all slot cycles to repeat.

17. A wireless routing node for use in a hierarchical wireless mesh network, comprising
- means for wirelessly communicating with a parent routing node and at least one child routing node, and for receiving slot scheduling information from the parent routing node, wherein the slot scheduling information indicates one or more time slots during which the parent routing node has scheduled communications with the routing node; and
- means for computing a data slot transmission schedule that indicates time slots for transmission of data between the parent routing node and the at least one child routing node based on the slot scheduling information received from the parent routing node and the number of child routing nodes associated with the routing node, such that the number of child routing nodes associated with the routing node scheduled in any cycle of the data slot transmission schedule is relatively prime to the number of child nodes associated with the parent routing node scheduled in the same cycle of the data slot transmission schedule.

18. The wireless routing node of claim 17 further comprising
- means for deriving slot scheduling information from the computed data slot transmission schedule; and
- means for transmitting the derived slot scheduling information to the at least one child routing node.

19. The wireless routing node of claim 17 wherein the slot scheduling information received from the parent routing node comprises a slot identifier and an effective number of child nodes associated with the parent routing node.

20. The wireless routing node of claim 19 wherein the slot scheduling information further comprises the actual number of child nodes associated with the parent routing node.

21. The wireless routing node of claim 18 wherein the slot scheduling information received from the parent routing node comprises a slot identifier and an effective number of child nodes associated with the parent routing node; wherein the wireless routing node further comprises
- means for computing an effective number of child nodes based on the actual number of child nodes associated with the routing node, the slot identifier received from the parent routing node, and the effective number of child nodes associated with the parent routing node; and wherein the data slot transmission schedule is based in part on the effective number of child nodes computed by the routing node.

22. The wireless routing node of claim 17 wherein the slot scheduling information further comprises a time stamp; and wherein the wireless routing node further comprises
- means for synchronizing implementation of the data slot transmission schedule based at least in part on the time stamp.

23. The wireless routing node of claim 17 further comprising deriving slot numbers for the time slots of the slot scheduling information based on a circular address space, the circular address space being bound by a number that allows all slot cycles to repeat.

* * * * *